(12) United States Patent
Nishikawa et al.

(10) Patent No.: US 7,911,455 B2
(45) Date of Patent: Mar. 22, 2011

(54) TOUCH PANEL UNIT

(75) Inventors: Kazuhiro Nishikawa, Kyoto (JP); Takeshi Asakura, Kyoto (JP); Noriaki Tsuchida, Kyoto (JP); Koichi Hamaoka, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 790 days.

(21) Appl. No.: 11/885,880

(22) PCT Filed: Mar. 6, 2006

(86) PCT No.: PCT/JP2006/304276
§ 371 (c)(1),
(2), (4) Date: Sep. 7, 2007

(87) PCT Pub. No.: WO2006/095684
PCT Pub. Date: Sep. 14, 2006

(65) Prior Publication Data
US 2008/0136788 A1    Jun. 12, 2008

(30) Foreign Application Priority Data

Mar. 8, 2005   (JP) .................................. 2005-063888

(51) Int. Cl.
*G06F 3/041* (2006.01)
(52) U.S. Cl. ........................................ 345/173; 345/905
(58) Field of Classification Search .................. 345/156, 345/173–181
See application file for complete search history.

(56) References Cited

U.S. PATENT DOCUMENTS 6,556,189 B1 * 4/2003 Takahata et al. .............. 345/173

FOREIGN PATENT DOCUMENTS

| JP | 61-87427     | 6/1986  |
|----|--------------|---------|
| JP | 61-88631     | 6/1986  |
| JP | 61-146832    | 9/1986  |
| JP | 61-189535    | 11/1986 |
| JP | 61-201228    | 12/1986 |
| JP | 5-12949      | 1/1993  |
| JP | 6-48137      | 6/1994  |
| JP | 9-17277      | 1/1997  |
| JP | 2000-270063  | 9/2000  |
| JP | 2002-132449  | 5/2002  |
| JP | 2003-23480   | 1/2003  |

OTHER PUBLICATIONS

International Preliminary Report on Patentability issued Mar. 6, 2008 in the International (PCT) Application No. PCT/JP2006/304276.
International Search Report (along with English translation) issued in International Application No. PCT/JP2006/304276.

* cited by examiner

*Primary Examiner* — Duc Q. Dinh
(74) *Attorney, Agent, or Firm* — Wenderoth, Lind & Ponack, L.L.P.

(57) ABSTRACT

There are provided a design sheet attached to the surface of an upper electrode film of a touch panel such that the design sheet is protruded at its periphery from the touch panel and a touch-panel-unit casing which is integrally molded with the design sheet such that the casing is covered at its surface with the design sheet and surrounds the side surfaces of the touch panel.

7 Claims, 22 Drawing Sheets

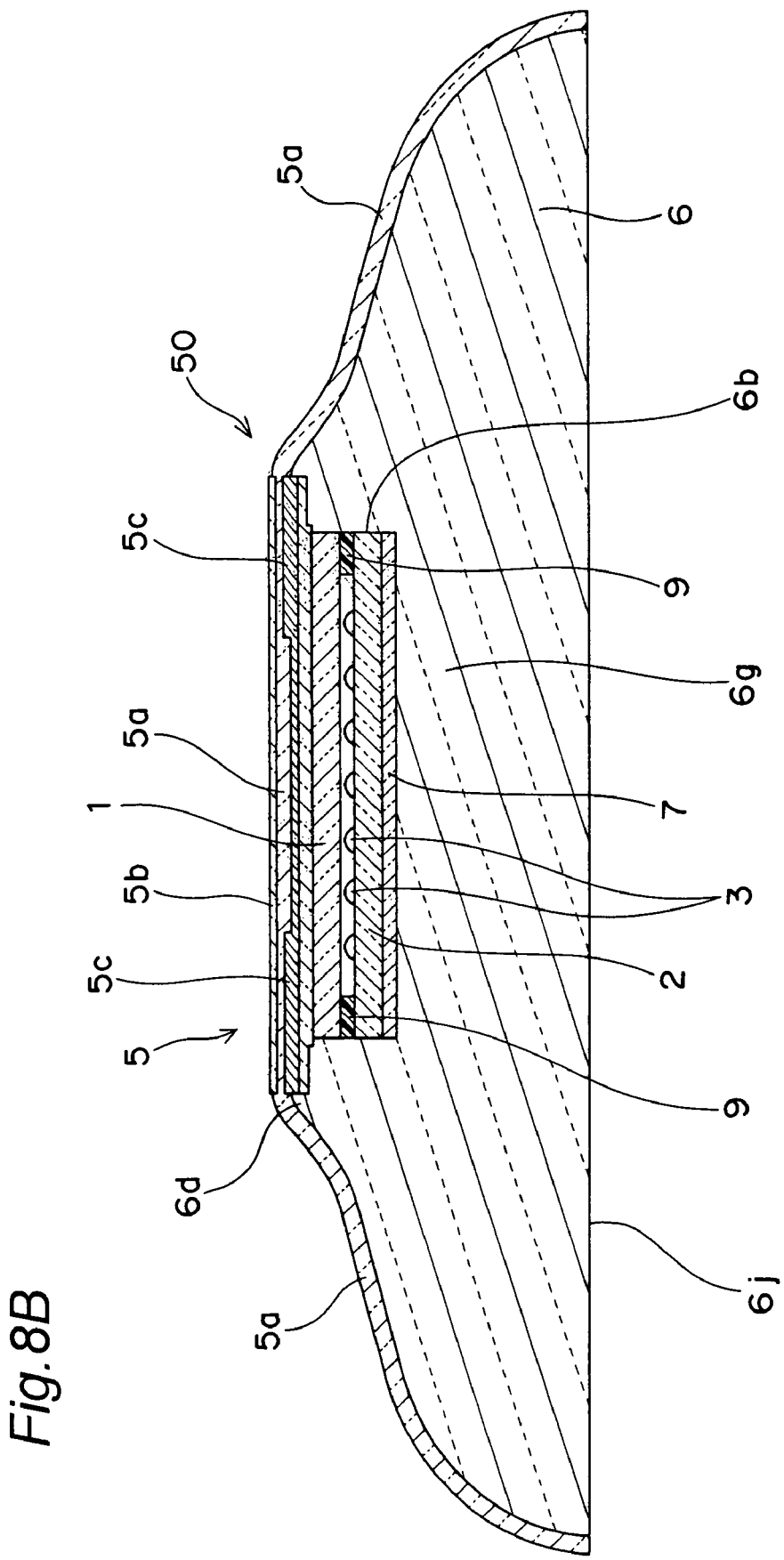

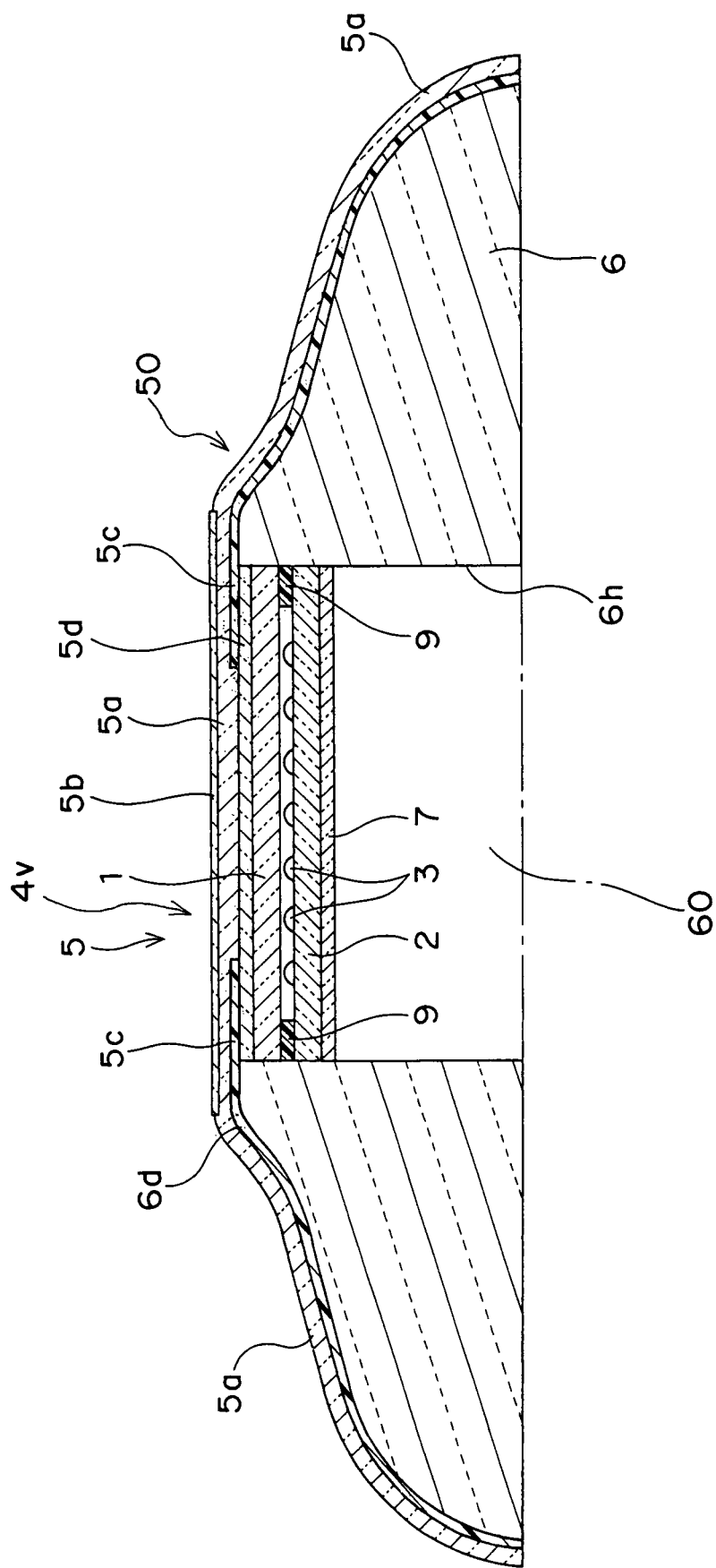

TOUCH PANEL UNIT

The present invention relates to a touch panel to be used as a coordinate inputting means and a pressed-position detection means and a touch panel unit including a panel for protecting a display window in an electronic apparatus employing the touch panel.

BACKGROUND ART

A touch panel having a displaying function which is incorporated in an electronic apparatus such as a cellular phone, a smart phone, or a PDA is mounted through the following method. That is, as illustrated in FIG. 16, a display unit 102 such as a liquid crystal display is fitted into a lower casing 101, then a touch panel 103 is attached to the display unit 102 at the peripheries of their surfaces or over their entire surfaces, thereafter the touch panel 103 is covered with an upper casing 104 having an opening portion 104a which defines the display area of the touch panel 103 while the periphery of the surface of the touch panel 103 is pressed by the upper casing 104 and, then, the upper casing 104 and the lower casing 101 are coupled to each other to mount the touch panel 103 thereto (refer to patent document 1, (JP-A No. 2000-270063), for example).

However, the background art has issues as follows.

Since the touch panel 103 is covered with the upper casing 104 at the periphery of the surface of the touch panel 103, there is inevitably generated a level difference corresponding to the thickness of the upper casing 104 with respect to the surface of the touch panel 103, which makes it difficult to provide a structure of good design having a flat surface.

Furthermore, when the upper casing 104 is mistakenly pressed during input operations, the touch panel 103 may be pressed on a portion of the peripheral portion by the upper casing 104 thereby causing false input to the touch panel 103 or the touch panel 103 may be caused to slide repeatedly at the same portion thereof along the edge of the opening portion 104a of the upper casing 104 by being guided by the level difference in the upper casing 104, thereby causing degradation of the touch-inputting function of the touch panel 103. Furthermore, when the operation surface of the touch panel 103 is wiped for removing dirt such as oils adhered thereto through inputting and the like, it is difficult to wipe completely the operation surface near the opening portion 104a of the upper casing 104.

Further, when a design sheet having a frame pattern at the periphery of the operation surface of the touch panel 103 within the opening portion 104a of the upper casing 104 or having characters describing a brand name or a model name printed thereon is attached in order to improve the design of the electronic apparatus, the sizes of the effective display area of the display and the effective input area of the touch panel 103 have to be reduced.

Furthermore, foreign substances such as dusts clog the gap between the upper casing and the touch panel, thereby inducing malfunction.

SUMMARY OF THE INVENTION

Therefore, it is an object of the present invention to overcome the aforementioned issues and to provide an integrally-molded touch panel unit which enables touch input through the display window of an electronic apparatus, preventing the touch-inputting operation surface from sliding at the same portion due to the level difference on the casing, wiping away dirt such as oils, preventing clogging of the gap between the upper casing and the touch panel with foreign substances such as dusts, with a structure of good design having a flat surface and allowing placement of a design sheet without reducing the sizes of the effective display area of the display and the effective input area of the touch panel.

In order to attain the aforementioned object, there is provided the following structures according to the present invention.

According to a first aspect of the present invention, there is provided an integrally-molded touch panel unit comprising:

a touch panel comprising an upper electrode film and a lower electrode film which are placed oppositely with dot spacers interposed therebetween such that their electrode surfaces are faced inwardly;

a design sheet attached to a surface of the upper electrode film in the touch panel such that the design sheet is protruded at its periphery from the touch panel (4); and a touch-panel-unit casing which is integrally molded with the design sheet such that the casing is covered at its surface with the design sheet and surrounds side surfaces of the touch panel.

According to a second aspect of the present invention, there is provided the integrally-molded touch panel unit according to the first aspect, wherein the touch-panel-unit casing further comprises a touch panel supporting portion for supporting the touch panel by contacting a back surface of the lower electrode film in the touch panel.

According to a third aspect of the present invention, there is provided the integrally-molded touch panel unit according to the first or second aspect, wherein an air hole is provided through the lower electrode film.

According to a fourth aspect of the present invention, there is provided the integrally-molded touch panel unit according to the second aspect, wherein the lower electrode film and the touch panel supporting portion in the touch-panel-unit casing are attached to each other by an adhesive agent.

According to a fifth aspect of the present invention, there is provided the integrally-molded touch panel unit according to the first or second aspect, wherein a through hole is provided through the lower electrode film and the supporting plate-cum-casing, and a conductor for connecting an external substrate to a connection terminal in the touch panel is provided within the through hole.

According to the present invention, the design sheet is attached to the surface of the upper electrode film in the touch panel such that the design sheet is protruded at its periphery from the touch panel, and the touch-panel-unit casing is molded integrally with the design sheet, so that the design sheet covers the surface of the touch-panel-unit casing and the touch-panel-unit casing surrounds the side surfaces of the touch panel, which completely eliminates the level difference between the portion at which the touch panel is placed and the touch-panel-unit casing (in other words, the touch operation surface of the touch panel unit is substantially flush with the surface therearound) when the touch panel unit is viewed from the outside thereof, thereby offering a structure of good design having a flat surface.

Further, the casing and the touch panel are not overlapped with each other, which can prevent the occurrence of false inputs to the touch panel, even if the casing is pushed during inputting operations. Further, since there is no level difference between the casing and the portion at which the touch panel is placed when the touch panel unit is viewed from the outside thereof, it is possible to prevent the touch panel from repeatedly sliding at the same position thereof along the edge of the opening by being guided by such a level difference, thereby preventing the degradation of the touch-inputting function. Further, when the touch operation surface (the operation area of the touch panel) is wiped for removing dirt such as oils adhered thereto through inputting and the like, it is possible to wipe completely the dirt on the operation area of the touch panel, since there is no level difference between the casing and the portion at which the touch panel is placed when the touch panel unit is viewed from the outside. Further, since there is no level difference between the upper casing and the portion at which the touch panel is placed and, thus, no gap therebetween, it is possible to prevent malfunction caused by clogging due to foreign substances such as dusts.

Further, it is possible to easily form a design sheet having a frame pattern at the periphery or having characters describing a brand name or a model name printed thereon, integrally with the casing to attach the design sheet to the casing in order to improve the design of the electronic apparatus, without reducing the sizes of the effective display area of the display and the effective input area of the touch panel.

Further, the design sheet covers the portion where the casing and the touch panel are coupled to each other such that they are sealed from the outside, which can improve humidity resistance, also can prevent the intrusion of gas thereby preventing corrosion, can prevent the intrusion of water even if the electronic apparatus incorporating the touch panel unit is accidentally submerged, and also can prevent the exfoliation of the design sheet.

BRIEF DESCRIPTION OF THE DRAWINGS

These and other aspects and features of the present invention will become clear from the following description taken in conjunction with the preferred embodiments thereof with reference to the accompanying drawings, in which:

FIG. 8B is a cross-sectional view of a touch panel unit according to a modification of the second embodiment of the present invention;

FIG. 9A is a cross-sectional view of a touch panel unit according to a third embodiment of the present invention;

DETAILED DESCRIPTION OF THE INVENTION

Figure 1A:
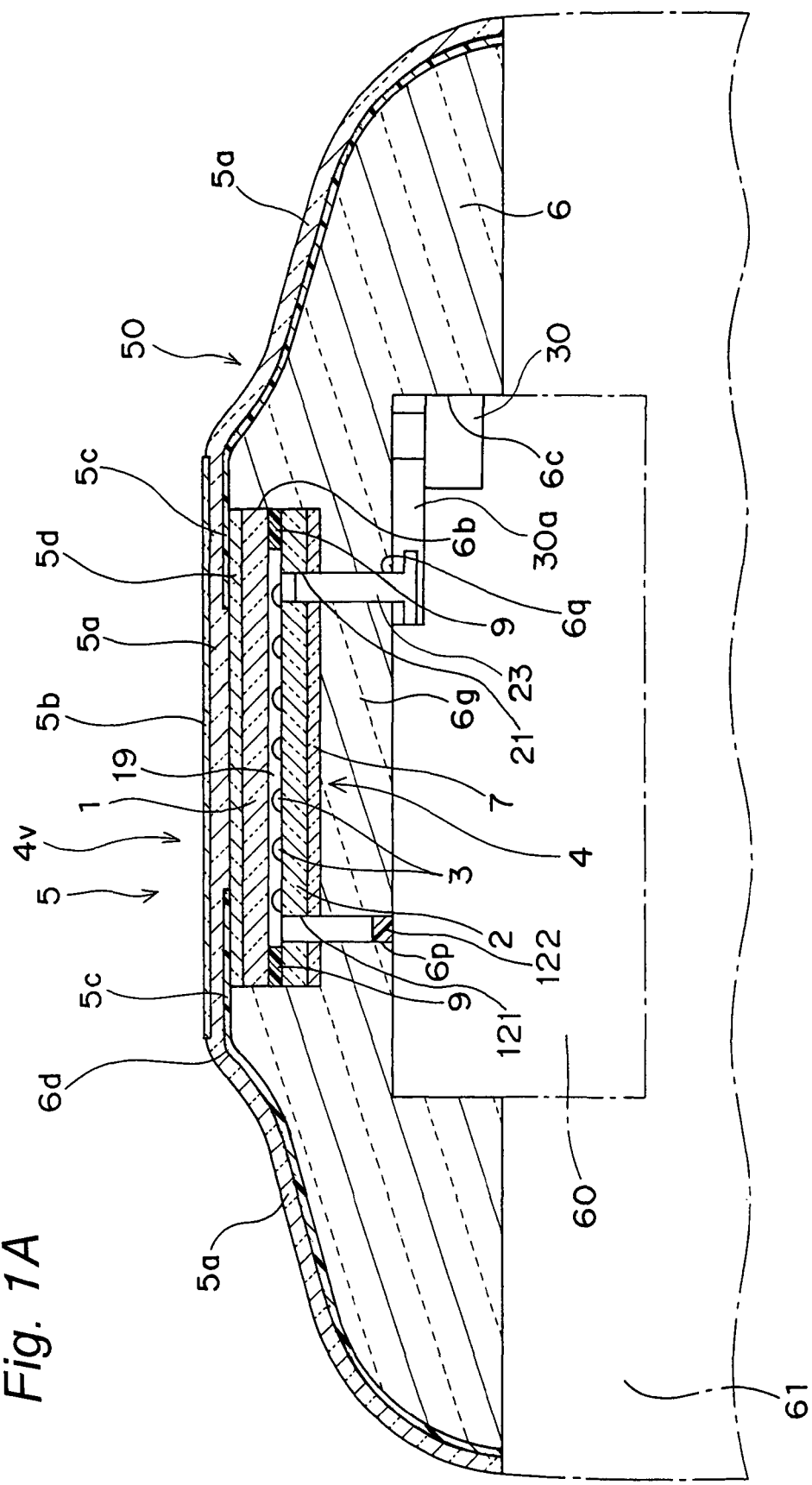
FIG. 1A is a cross-sectional view of a touch panel unit according to a first embodiment of the present invention.

Before the description of the present invention proceeds, it is to be noted that like parts are designated by like reference numerals throughout the accompanying drawings.

Hereinafter, a touch panel unit according to the present invention will be described in detail with reference to the drawings.

Figure 2A:
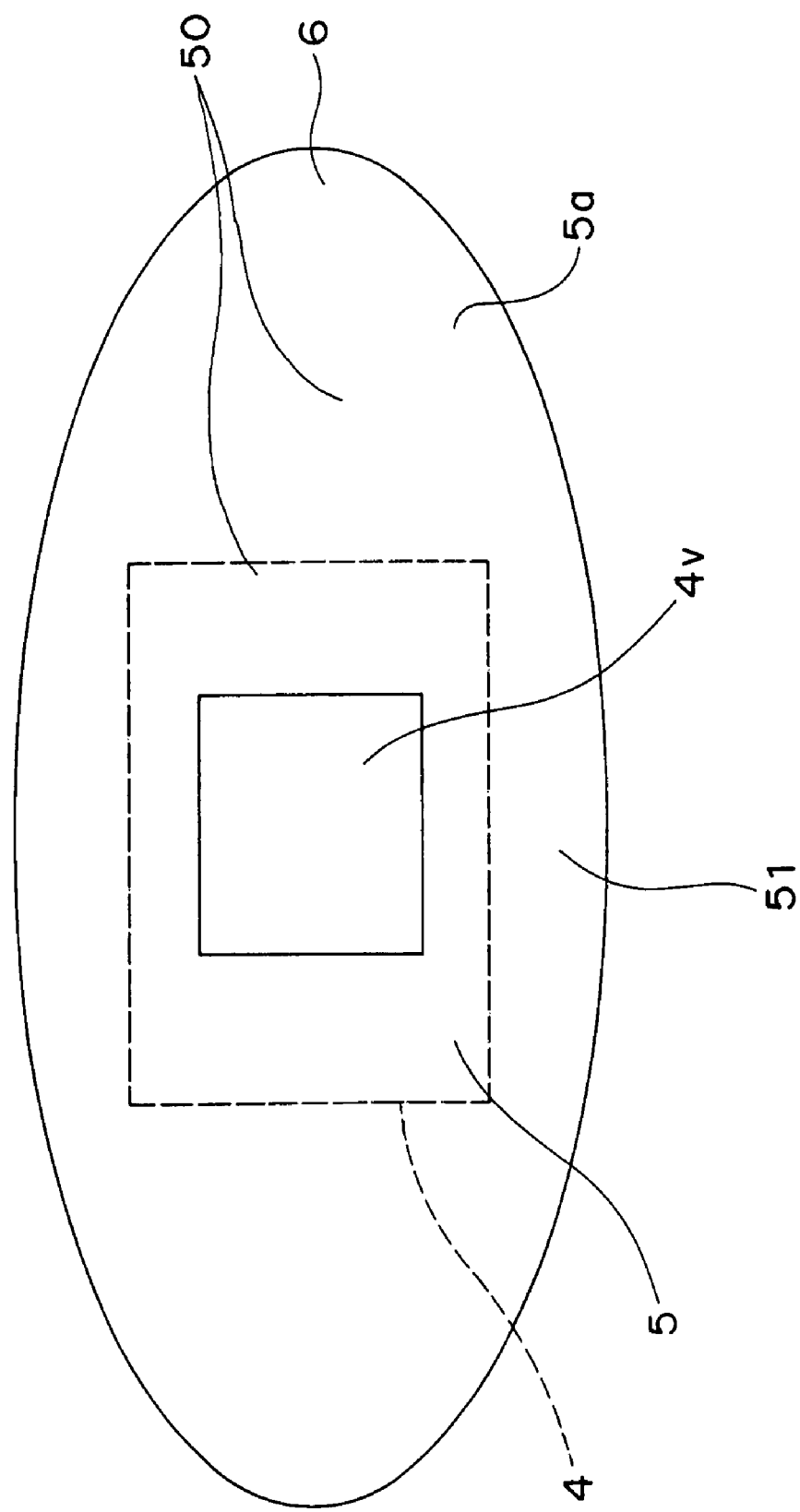
FIG. 2A is a plan view of the touch panel unit according to the first embodiment.

An integrally-molded touch panel unit according to a first embodiment of the present invention is constituted by a touch panel 4, a design sheet 5 placed on the upper surface (the outer surface) of the touch panel 4, and a supporting plate-cum-casing 6 as an example of a touch-panel-unit casing placed around the design sheet 5, as illustrated in FIGS. 1A and 2A.

The touch panel 4 is a touch panel having a representational function and being capable of being mounted to a display unit such as a liquid crystal display of an electronic apparatus such as a cellular phone, a smart phone, a portable gaming machine, or a PDA. Further, the touch panel 4 is structured to include an upper electrode film 1 and a lower electrode film 2 which are placed such that their electrode surfaces are faced inwardly and they are opposed to each other with a plurality of insulation dot spacers 3 interposed therebetween, wherein the upper electrode film 1 and the lower electrode film 2 are attached to each other by a double-sided adhesive agent 9 such as a rectangular-frame-shaped double-sided tape.

Figure 3:
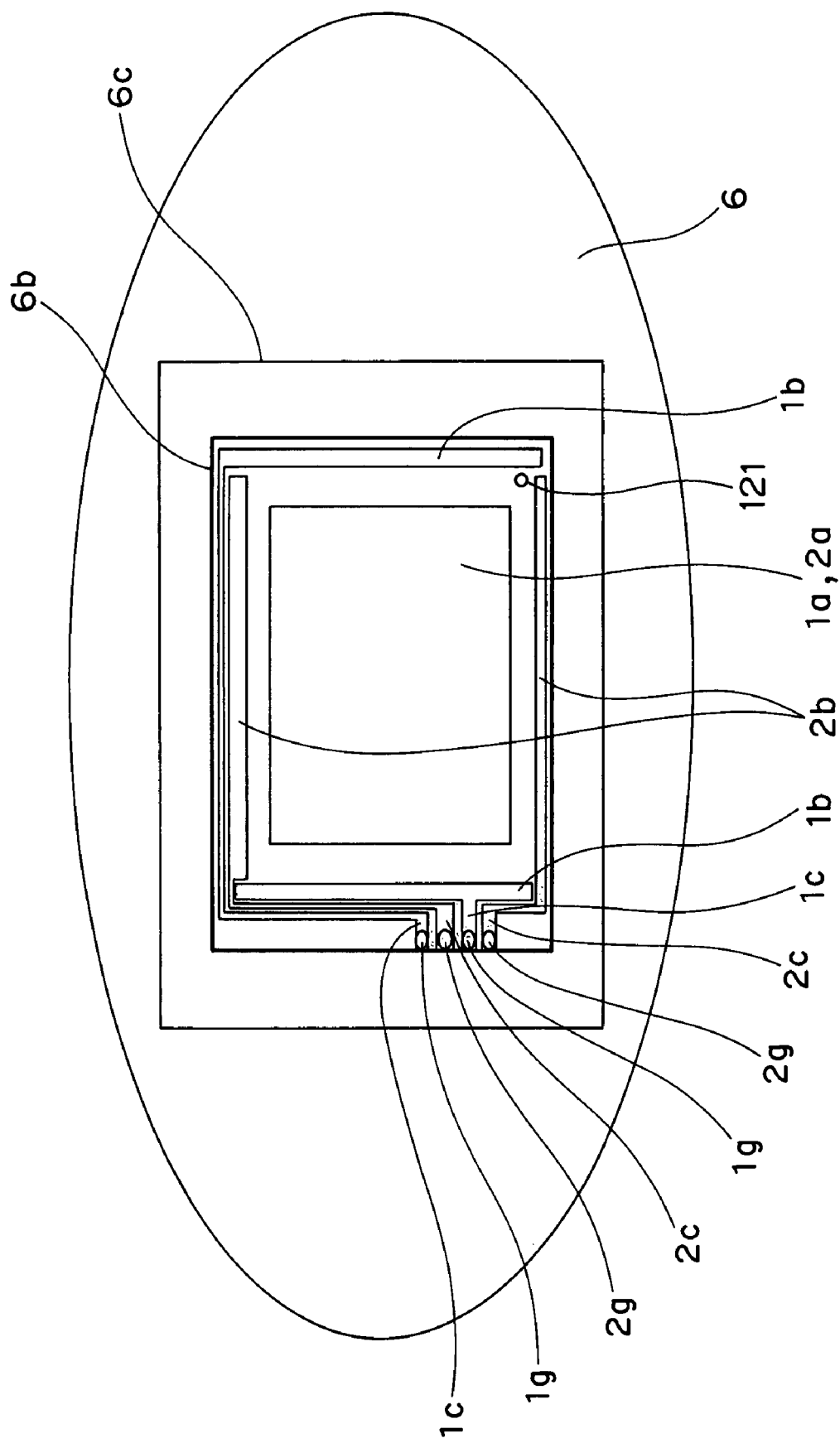
FIG. 3 is a bottom view of the touch panel unit according to the first embodiment.

As illustrated in FIG. 3, the lower electrode film 2 in the touch panel 4 is constituted by a transparent conductive film 2a as an electrode, a pair of lower bus bars 2b, 2b which are parallel to each other, and a pair of routing circuits 2c, 2c connected to the pair of lower bus bars 2b, 2b, which are formed on the upper surface (the electrode surface) of a transparent insulation substrate. The end portions of the pair of routing circuits 2c, 2c are collected at a single portion and are provided with a pair of terminals 2g, 2g for connection to an external substrate 30.

The transparent insulation substrate used in the lower electrode film 2 can be made of a polycarbonate-based, polyamide-based, or polyetherketone-based engineering plastic, or an acrylic, polyethylene terephthalate-based, or polybutylene terephthalate-based transparent film, or the like.

The upper electrode film 1 in the touch panel 4 is constituted by a transparent conductive film 1a as an electrode, a pair of upper bus bars 1b, 1b which are parallel to each other, and a pair of routing circuits 1c, 1c connected to the pair of upper bus bars 1b, 1b, which are formed on the lower surface (the electrode surface) of a flexible transparent insulation substrate. The end portions of the pair of routing circuits 1c, 1c are collected at a single portion and are provided with a pair of terminals 1g, 1g for connection to the external substrate 30. The flexible transparent insulation substrate used in the upper electrode film 1 is not limited to a substrate made of a single transparent film, but can be made of laminated transparent films. This is preferable since the durability of the entire touch panel 4 is increased.

The flexible transparent insulation substrate used in the upper electrode film 1 exhibits a property of bending when pushed by a finger or the like. The flexible transparent insulation substrate can be made of a polycarbonate-based, polyamide-based or polyetherketone-based, engineering plastic, or the like or an acrylic, polyethylene terephthalate-based, or polybutylene terephthalate-based transparent film, or the like.

The transparent conductive films 1a and 2a used in the upper electrode film 1 and the lower electrode film 2 respectively can be metal oxide films made of tin oxide, indium oxide, antimony oxide, zinc oxide, and cadmium oxide, or indium tin oxide (ITO) or the like; composite films mainly made of these metal oxides; or metal films made of gold, silver, copper, tin, nickel, aluminum, palladium, or the like. Further, the transparent conductive films 1a and 2a may be multilayers constituted by two or more layers. Further, the transparent conductive films 1a and 2a can be formed through vacuum deposition, sputtering, ion plating, or CVD methods.

Further, a large number of the dot spacers 3 can be formed on any of the surfaces of the transparent conductive films used in the upper electrode film 1 and the lower electrode film 2.

The upper bus bars 1b and the lower bas bars 2b can be formed from metal such as gold, silver, copper, or nickel or a conductive paste made of carbon or the like. The upper bus bars 1b and the lower bas bars 2b can be formed through a printing method such as screen printing, offset printing, gravure printing, flexographic printing; a photoresist method; a brush coating method; or the like. Generally, the respective bus bars 1b and 2b are formed at positions which are as close as possible to the end portions of the transparent insulation substrates, in order to provide, at the center portion, a widest possible area in which the bus bars 1b and 2b are not formed. The area in which the bus bars 1b and 2b are not formed, namely the inputting area and the displaying area, are defined in width and shape such that it conforms, in width and shape, to the inputting area and the displaying area of the cellular phone, smart phone, PDA, or the like which employs the touch panel unit according to the first embodiment of the present invention.

The routing circuits 1c and 2c can be formed from metal such as gold, silver, copper, or nickel; or a conductive paste made of carbon or the like, through a printing method such as screen printing, offset printing, gravure printing or flexographic printing; a photoresist method; a brush coating method; or the like. Further, in the case where narrower circuits are formed as the routing circuits 1c and 2c, it is possible to use a dispenser.

Next, as illustrated in FIG. 1A, the design sheet is attached over the entire surface of the upper electrode film 1 in the touch panel 4 such that its periphery, preferably its entire periphery, is protruded from the touch panel 4. Further, the design sheet 5 is constituted by a transparent insulation substrate 5a, a hard coat layer 5b formed on the upper surface (namely the outer surface) of the transparent insulation substrate 5a and a pattern layer 5c and an adhesive layer 5d which are formed on a portion of the lower surface (namely the inner surface) of the transparent insulation substrate 5a.

The transparent insulation substrate 5a in the design sheet 5 is placed such that the substrate 5a covers the upper surface (the outer surface) of plane elliptical shape of the supporting plate-cum-casing 6. On the outer surface of the transparent insulation substrate 5a, there is placed the hard coat layer 5b as an outermost layer, on the quadrilateral operation area 4v of the touch panel 4 and the area around the operation area 4v (generally, on the area opposing to the touch panel 4 and the area therearound). Further, on the inner surface of the transparent insulation substrate 5a, there is placed the adhesive layer 5b on the area which is substantially opposed to the touch panel unit 4. On the other hand, on the inner surface of the transparent insulation substrate 5a, the pattern layer 5c is placed at the area other than the operation area 4v, namely at a decoration area 50. There is no need for placing the hard coat layer 5b at the area covering the upper surface of the supporting plate-cum-casing 6 (the area 51 which is not opposed to the touch panel 4 in the decoration area 50 in FIG. 2A).

Figure 1B:
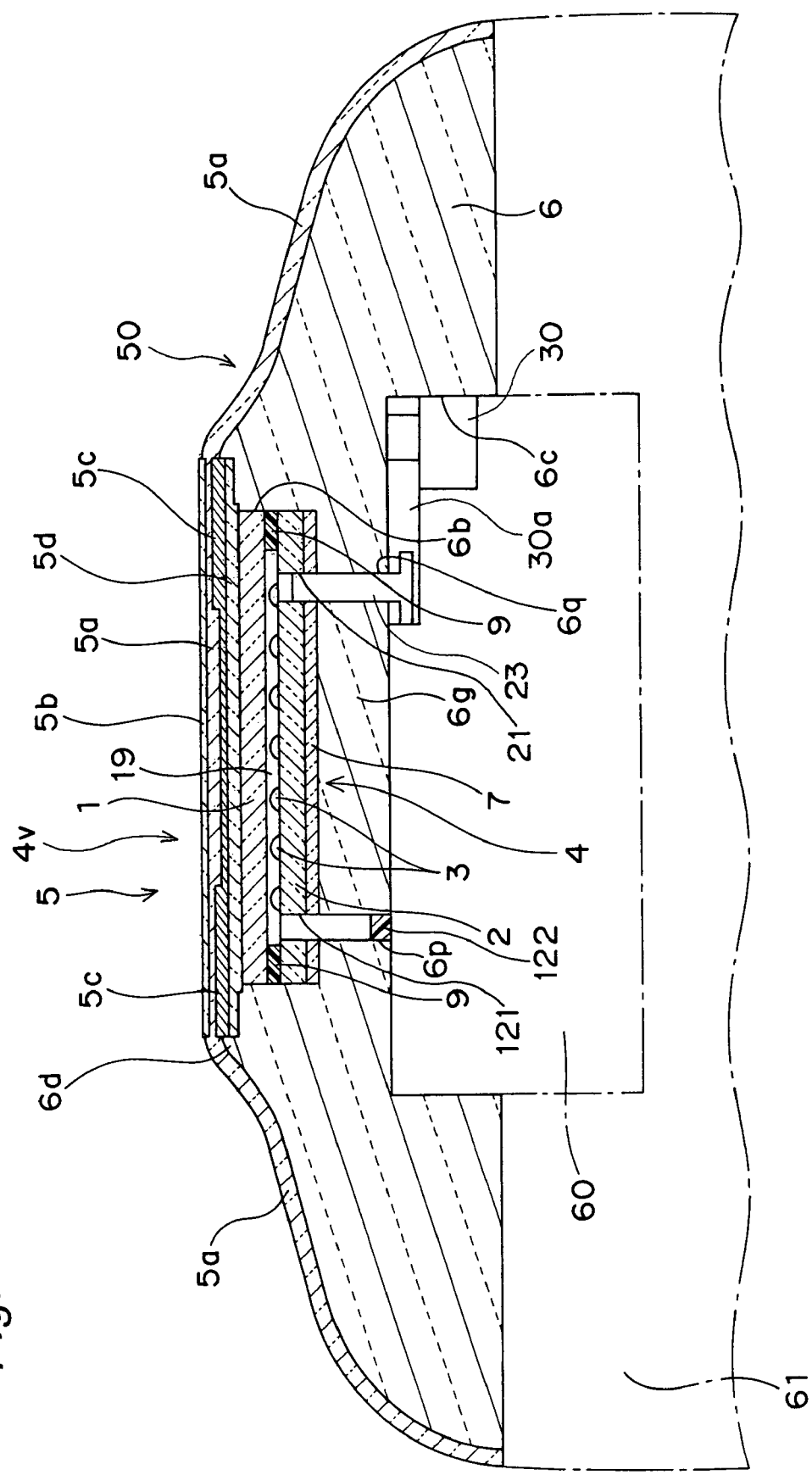
FIG. 1B is a cross-sectional view of a touch panel unit according to a modification of the first embodiment of the present invention.
Figure 2B:
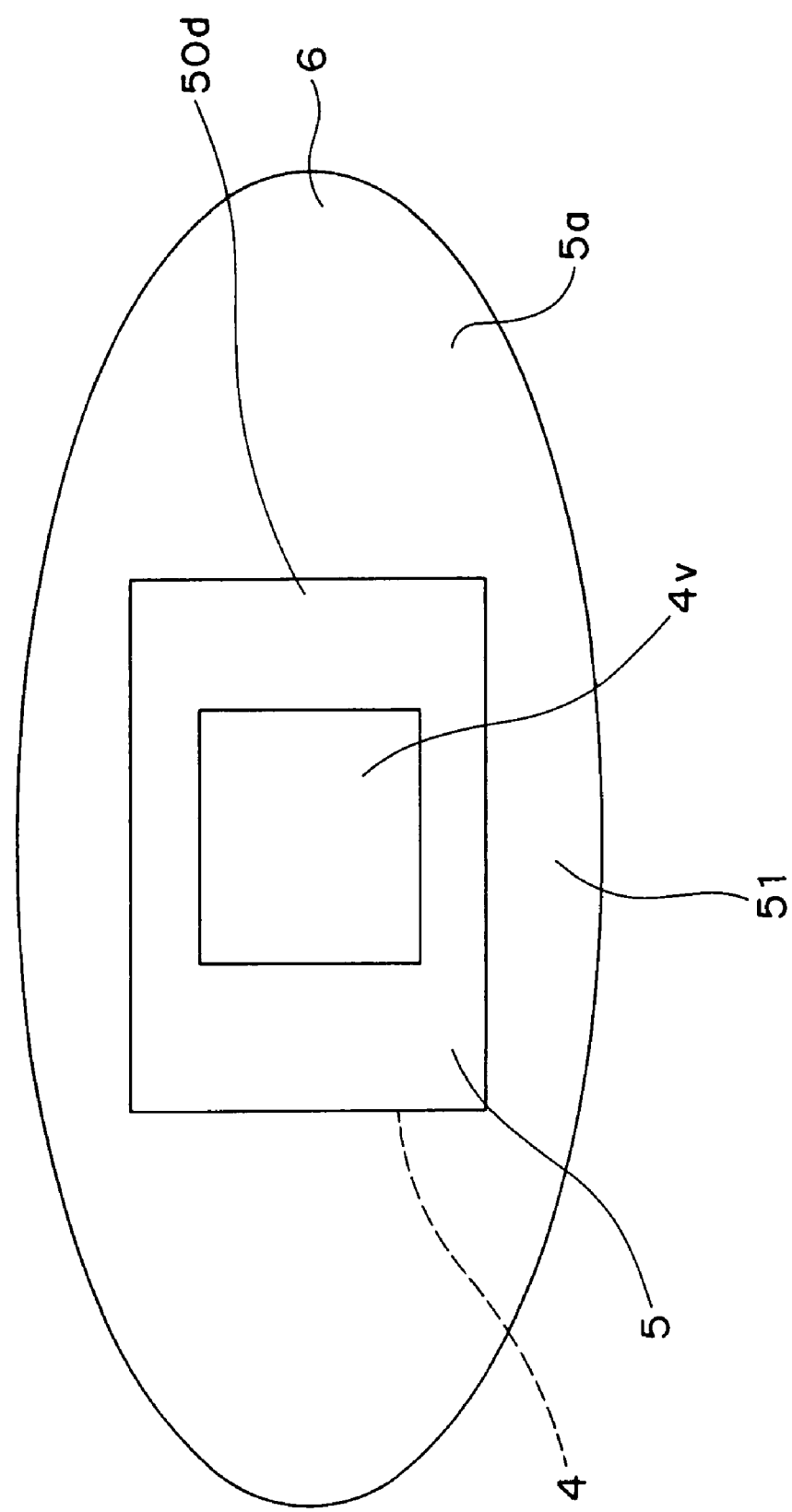
FIG. 2B is a plan view of the touch panel unit according to the modification of the first embodiment.

Further, as a modification of the first embodiment, the transparent insulation substrate 5a in the design sheet 5 is placed such that the substrate 5a covers the upper surface (the outer surface) of plane elliptical shape of the supporting plate-cum-casing 6, as illustrated in FIGS. 1B and 2B. The hard coat layer 5b as an outermost layer is placed on the outer surface of the transparent insulation substrate 5a at the quadrilateral decoration area 50d in FIG. 2B which includes the quadrilateral operation area 4v of the touch panel 4, while the pattern layer 5c and the adhesive layer 5d are placed on the inner surface of the transparent insulation substrate 5a at the decoration area 50b. There is no need for placing the hard coat layer 5b at the area covering the upper surface of the supporting plate-cum-casing 6 (the area 51 outside of the decoration area 50d in FIG. 2B).

In this case, the transparent insulation substrate 5a used in the design sheet 5 can be made of a polycarbonate-based, polyamide-based, or polyetherketone-based engineering plastic, or an acrylic, polyethylene terephthalate-based, or polybutylene terephthalate-based transparent film, or the like. The transparent insulation substrate 5a is required to have good heat resistance in order to withstand heat during the molding. A preferable specific example of the transparent insulation substrate 5a is a polyethylene terephthalate film having a thermal contraction rate of about 40% in the direction of MD (the direction of drawing: Machine Direction) at 80 degrees centigrade and having a thickness in the range of 25 to 60 μm. A concrete exemplary product name is HISHIPET "LX-10S", which is a film having a thickness of 60 μm manufactured by Mitsubishi Plastics, Inc. The aforementioned concrete exemplary product is preferable, since (1) it can prevent occurrence of wave undulation and warpage of the film due to the stress generated by the pressurization during the molding and (2) it can prevent the degradation of the input characteristics and the surface durability of the touch panel.

The hard coat layer 5b, which is for increasing the hardness of the surface of the operation area 4v of the touch panel 4, can be made of an inorganic material such as a siloxane-based resin or an organic material such as an acrylic-epoxy-based or urethane-based thermosetting resin or an acrylate-based photo-curing resin. It is preferable that the hard coat layer 5b has a thickness in the range of about $1\times10^{-3}$ to $7\times10^{-3}$ mm. Insufficient surface hardness results when the hard coat layer $5b$ has a thickness less than 1 μm ($10^{-3}$ mm). On the other hand, when the hard coat layer $5b$ has a thickness greater than 7 μm, cracks may be caused during processes such as molding. Consequently, it is preferable that the thickness of the hard coat layer $5b$ falls within the aforementioned range. Further, anti-glare treatment can be applied to the hard coat layer $5b$ in order to prevent light reflection. For example, roughening treatment can be applied to the flexible transparent insulation substrate $5a$ or the hard coat layer $5b$ or silica as an extender pigment or fine particles of alumina or the like can be mixed into the hard coat layer $5b$.

The pattern layer $5c$, which is for forming a pattern around the operation area $4v$ of the touch panel 4, can be formed from a colorant ink containing a resin as a binder and also containing a pigment or dye of an appropriate color as a colorant, wherein the resin can be a polyvinyl-based resin, a polyamide-based resin, a polyester-based resin, a polyacrylic resin, a polyurethane-based resin, a polyvinyl acetal-based resin, a polyester polyurethane-based resin, or an alkyd resin. The pattern layer $5c$ can be formed through a conventional printing method such as screen printing, offset printing, gravure printing, or flexographic printing. Particularly, it is preferable to employ an offset printing method or a gravure printing method, in the case of multiple color printing or tone expression.

Further, the pattern layer $5c$ can be formed from a metal thin layer or a combination of a pattern-printed layer and a metal thin layer. Such a metal thin layer exhibits a metal luster as a pattern layer and can be formed through vacuum deposition, sputtering, ion plating, plating, or the like. In this case, metal such as aluminum, nickel, gold, platinum, chromium iron, copper, tin, indium, silver, titanium, lead, or zinc; or an alloy or a compound made of these metals can be used, according to the color of metal luster which is desired to be expressed. Generally, the metal thin layer is formed to have a thickness of about 0.05 μm. Further, in providing the metal thin layer, a pre-anchor layer or a post-anchor layer can be provided in order to enhance the adhesion of the metal thin layer to other layers.

The adhesive layer $5d$, which is for bonding and anchoring the upper electrode film 1 to the transparent insulation substrate $5a$ in the design sheet 5, is made of a proper resin having thermosensitivity or pressure-sensitivity which is suitable for bonding the upper electrode film 1 to the transparent insulation substrate $5a$ in the design sheet 5. For example, in the case where the transparent insulation substrate is made of a polycarbonate-based or polyamide-based material, it is preferable to use a polyacrylic resin, a polystyrene-based resin, a polyamide-based resin, or the like for the adhesive layer $5d$. Also, in the case where the transparent insulation substrate is made of an acrylic or polyethylene terephthalate-based material, it is preferable to use vinyl chloride, vinyl acetate, an acrylic copolymer, or the like for the adhesive layer $5d$. The adhesive layer $5d$ can be formed through a conventional printing method such as screen printing, offset printing, gravure printing, or flexographic printing. A preferable example of the adhesive layer $5d$ is a transparent UV-curable adhesive agent having high adherence. This is because (1) the use of such a UV-curable adhesive agent causes no degradation of the optical characteristics and the surface durability of the touch panel and (2) the use thereof can prevent the exfoliation due to stresses and the like during inputting.

Next, the supporting plate-cum-casing 6 is provided with a recessed portion $6b$ at its top portion $6d$, and the touch panel 4 and the adhesive layer $5d$ are tightly contacted to and housed within the recessed portion $6b$ at its lower recessed portion and upper recessed portion, respectively. The transparent insulation substrate $5a$ in the design sheet 5 covers the entire upper surface (the outer surface) of the supporting plate-cum-casing 6 from the top portion $6d$ around the upper opening of the recessed portion $6b$, so that there is no level difference between the portion at which the touch panel 4 is placed and the supporting plate-cum-casing 6, when the touch panel unit is viewed from the outside thereof. Further, since the touch panel 4 is tightly contacted to and housed within the recessed portion $6b$, the touch panel 4 is surrounded at all the side surfaces thereof by the supporting plate-cum-casing 6 and, also, the touch panel 4 is contacted at its bottom surface with the bottom surface of the recessed portion $6b$, so that the touch panel 4 is supported by the portion of the supporting plate-cum-casing 6 which is lower than the bottom surface of the recessed portion $6b$, namely a touch panel supporting portion $6g$. By bringing the touch panel 4 into tight contact with the recessed portion $6b$ as described above, it is possible to prevent the touch panel 4 from being displaced even when external impact force is applied thereto in the case of FIG. 1A. Further, it is preferable to bond and anchor the lower electrode film 2 to the bottom surface of the recessed portion $6b$ through an adhesive layer 7 placed on the lower surface of the lower electrode film 2 in the touch panel 4.

On the other hand, in the lower surface of the supporting plate-cum-casing 6, namely in the lower portion of the touch panel supporting portion $6g$, there is formed a lower recessed portion $6c$ into which a display unit 60 such as a liquid crystal display can be fitted. Accordingly, the supporting plate-cum-casing 6 is adapted to allow a lower casing 61 in which the display unit 60 such as a liquid crystal display is fitted to be assembled into the lower portion thereof through engagement or the like. When the display unit 60 is fitted in the lower recessed portion $6c$, the display unit 60 is placed such that the touch panel 4 is positioned above the display unit 60 with the touch panel supporting portion $6g$ interposed therebetween, which enables operating the touch panel 4 while viewing the display on the display unit 60. It is preferable that the lower recessed portion $6c$ and the display unit 60 are attached to each other at the peripheries of their opposing surfaces or over their entire opposing surfaces.

The resin for use in molding the supporting plate-cum-casing 6 can be selected out of resins having sufficient strength for supporting the touch panel 4 so as to serve as a support plate and also having excellent transparency and moldability. Exemplary resins include a methacrylate resin (PMMA), an acrylonitrile-styrene copolymer resin (AS), an acrylonitrile-butadiene-styrene copolymer resin (ABS), a cellulose propionate resin, a polycarbonate resin (PC), a polystyrene resin (PS), a polyester resin, or a polyethylene resin, and the use of a methacrylate resin (PMMA) is particularly preferable since it has excellent transparency. A preferable exemplary resin for use in molding the supporting plate-cum-casing 6 is a polycarbonate resin containing a glass reinforcement fiber by 10 to 20 weight percent. This is because (1) the use of such a polycarbonate resin can prevent the occurrence of warpage during the molding and during environment tests (high-temperature tests) and (2) the use thereof can prevent the deformation and the warpage due to stresses or the like during inputting.

Further, the resin used for molding the supporting plate-cum-casing 6 and the lower electrode film 2 can be bonded to each other through the fusion of the resin during the molding, but it is more preferable to place, preliminarily, the adhesive layer 7 on the lower surface of the lower electrode film 2, in order to bond them more strongly. The adhesive layer 7 is made of a proper resin having thermosensitivity or pressure-sensitivity which is compatible with the materials of the transparent insulation substrate in the lower electrode film 2 and of the supporting plate-cum-casing 6. For example, in the case where the transparent insulation substrate in the lower electrode film 2 and the supporting plate-cum-casing 6 are made of polycarbonate-based or polyamide-based materials, for example, it is preferable to use a polyacrylic resin, a polystyrene-based resin, a polyamide-based resin, or the like for the adhesive layer 7. Also, in the case where the transparent insulation substrate in the lower electrode film 2 and the supporting plate-cum-casing 6 are made of acrylic or polyethylene-terephthalate-based materials, it is preferable to use vinyl chloride, vinyl acetate, acrylic copolymer, or the like for the adhesive layer 7. The adhesive layer 7 is preferably formed through a conventional printing method such as screen printing, offset printing, gravure printing, or flexographic printing.

Figure 17:
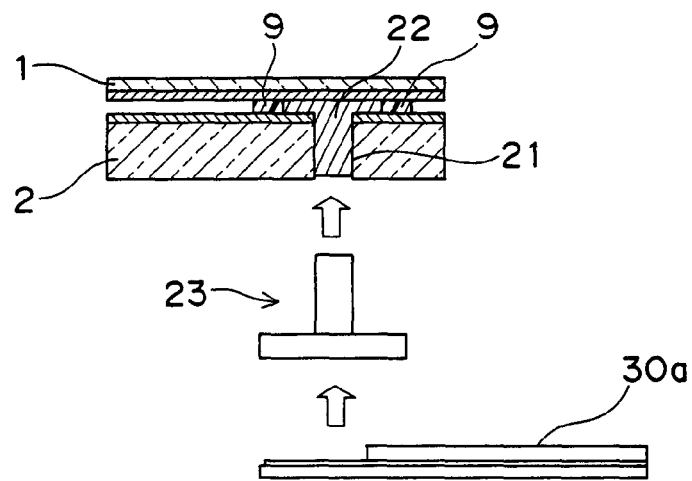
FIG. 17 is an exploded cross-sectional view of an exemplary means for extracting electrical signals from the touch panel according to the embodiments of the present invention.
Figure 18:
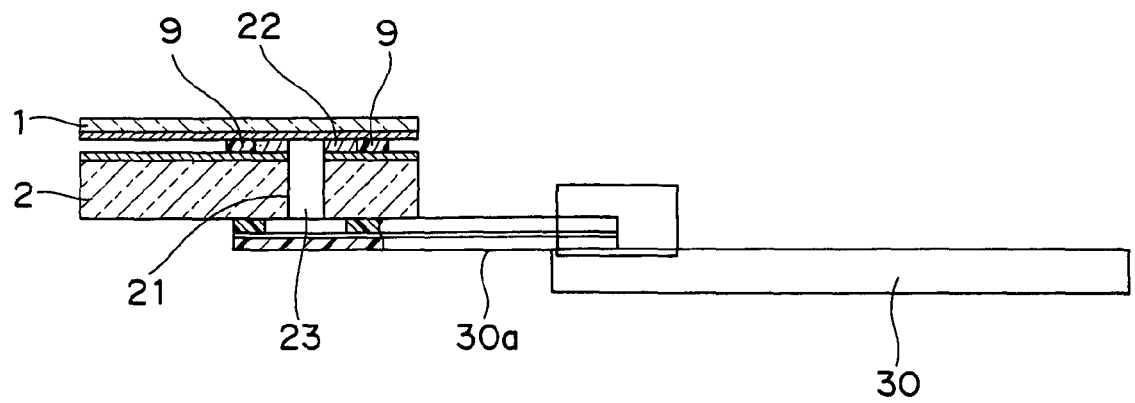
FIG. 18 is a cross-sectional view of the touch panel according to the embodiments of the present invention in which the means for extracting electrical signals of FIG. 17 is incorporated.
Figure 19:
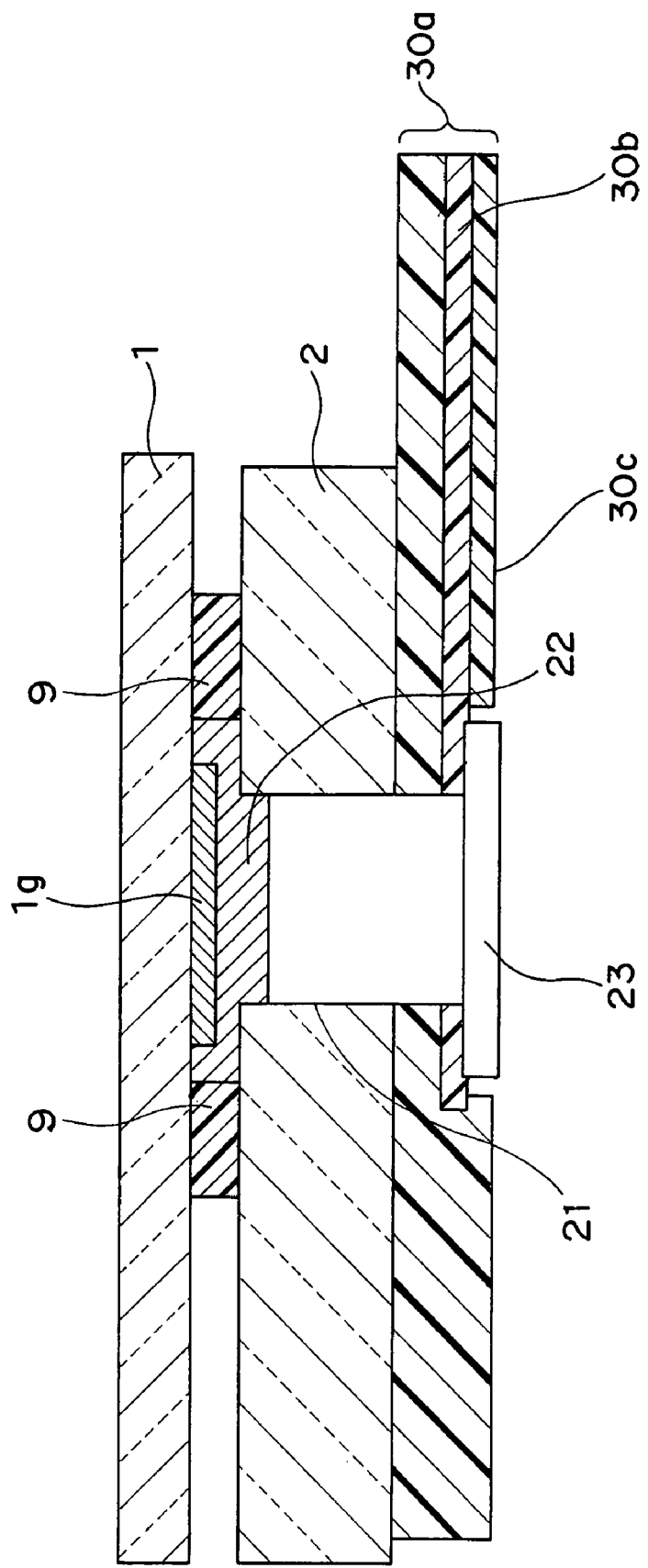
FIG. 19 is a partially enlarged cross-sectional view of FIG. 18.

Further, as a means for extracting electrical signals in the touch panel 4, four through holes 21 for connection to an external substrate are preliminarily formed through the lower electrode film 2, using a drill or a pressing machine. After the supporting plate-cum-casing 6 is molded and secured to the touch panel 4, a conductive adhesive agent 22 is filled in each of the four external-substrate connection through holes 21 which are communicated with through holes 6q formed through the supporting plate-cum-casing 6 during molding as illustrated in FIGS. 17 to 19 and, further, four metal pins 23 as examples of conductors are inserted or press-fitted into the conductive adhesive agent 22 in the four external-substrate connection through holes 21 to be secured thereto. At this time, the pins 23 press-fitted therein cause a portion of the conductive adhesive agent 22 filled in the external-substrate connection through holes 21 to be intruded into the space between the upper electrode film 1 and the lower electrode film 2 from the external-substrate connection through holes 21, but it is retained in the space inside of the double-sided adhesive agent 9. These four metal pins 23 placed in the respective four external-substrate connection through holes 21 are placed to be connected to the pair of connection terminals 1g, 1g for connection to an external substrate in the routing circuit 1c on the upper electrode film 1 and the pair of connection terminals 2g, 2g for connection to the external substrate in the routing circuit 2c on the lower electrode film 2, so that these four metal pins 23 enable connection between the routing circuits 1c and 2c and the external substrate 30. Further, FIG. 19 illustrates a state where a single connection terminal 1g out of the pair of connection terminals 1g, 1g for connection to the external substrate, a single metal pin 23, and a circuit 30b in a connection cable 30a for connection of the external substrate 30 are electrically connected to one another through the conductive adhesive agent 22 in the external-substrate connection through hole 21, while the other connection terminals 1g, 2g, 2g and the circuit 30b in the connection cable 30a for connection of the external substrate 30 are connected to one another in the same way. Outside of the circuit 30b, there is placed a cover film 30c. Further, in other embodiments, although not illustrated, a means for extracting electrical signals in the touch panel 4 with basically the same structure and the same number of pins is provided.

The conductive adhesive agent 22 is preferably made of a resin as an adhesive agent and metal fillers of silver, gold, copper, or nickel dispersed in the resin and is of a type that is cured by being heated to a low temperature, since it is preferable to keep the touch panel at a low temperature and also it is preferable to produce the touch panel at a low temperature, in view of the heat resistance of the touch panel itself. More specifically, the adhesive agent 22 is preferably made of a thermosetting resin such as an epoxy resin, a phenolic resin, a silicon resin, or a polyester resin.

As the resin as the conductive adhesive agent 22 for sealing the external-substrate connection through holes 21, it is possible to use an acrylic, epoxy-based, or silicon-based thermosetting resin; UV-curable resin; or heat-and-UV-curable resin. For example, the external-substrate connection through holes 21 are formed to each have an inner diameter in the range of 0.5 to 3 mm.

Further, in the back surface of the touch panel 4, at least a single air hole 121 (see FIGS. 1A and 3) is formed through the lower electrode film 2 before the process for molding the supporting plate-cum-casing 6, wherein the air hole 121 is for communicating, to the outside, the air layer 19 formed by the plurality of dot spacers 3 between the upper electrode film 1 and the lower electrode film 2. This air hole 121 is provided for enabling discharge of air within the air layer 19 through the air hole 121 to the outside of the air layer 19 for effectively preventing the touch panel 4 from being damaged by the pressure of the resin, even when the air layer 19 is pressed by the pressure of the resin via the lower electrode film 2 during the process for molding the supporting plate-cum-casing 6, unlike the external-substrate connection through holes 21.

It is preferable that the air hole 121 has an inner diameter in the range of 0.5 to 3 mm. This is because, when the air hole 121 has an inner diameter less than 0.5 mm, the air hole 121 cannot carry out its function sufficiently, while when the air hole 121 has an inner diameter greater than 3 mm, this will degrade the functions and the external appearance of the touch panel 4. It is preferable that the air hole 121 is positioned outside of the effective input area and on the side where no connection terminal is formed, as illustrated in FIG. 3.

After the supporting plate-cum-casing 6 is molded, the air hole 121 is sealed with a resin such as a UV-curable resin 122 (see FIG. 1A). As the sealing material 122, it is preferable to use an UV-curable resin such as an epoxy-based UV-curable resin as examples. This is because such a UV-curable resin can be cured within a short time thereby eliminating the necessity of heat treatment, exerts no adverse influence on the functions and external appearance of the touch panel 4, and is good in productivity. There is no need for filling the resin 122 in the entire air hole 121 and, basically, it is necessary only to fill it within a portion of the air hole 121 near the back surface of the supporting plate-cum-casing 6 for closing the air hole 121.

Figure 4:
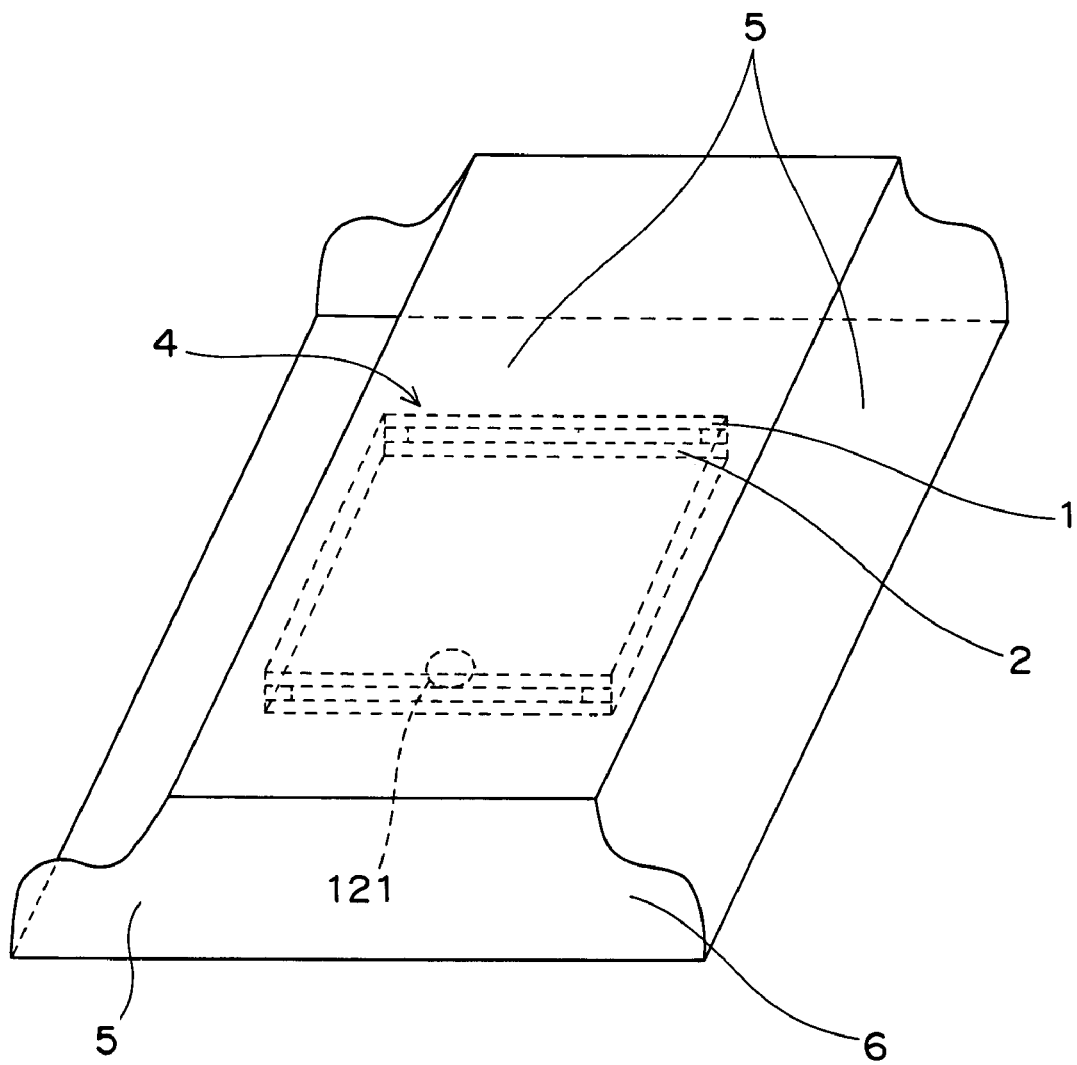
FIG. 4 is a perspective view of the touch panel unit according to the first embodiment.
Figure 10:
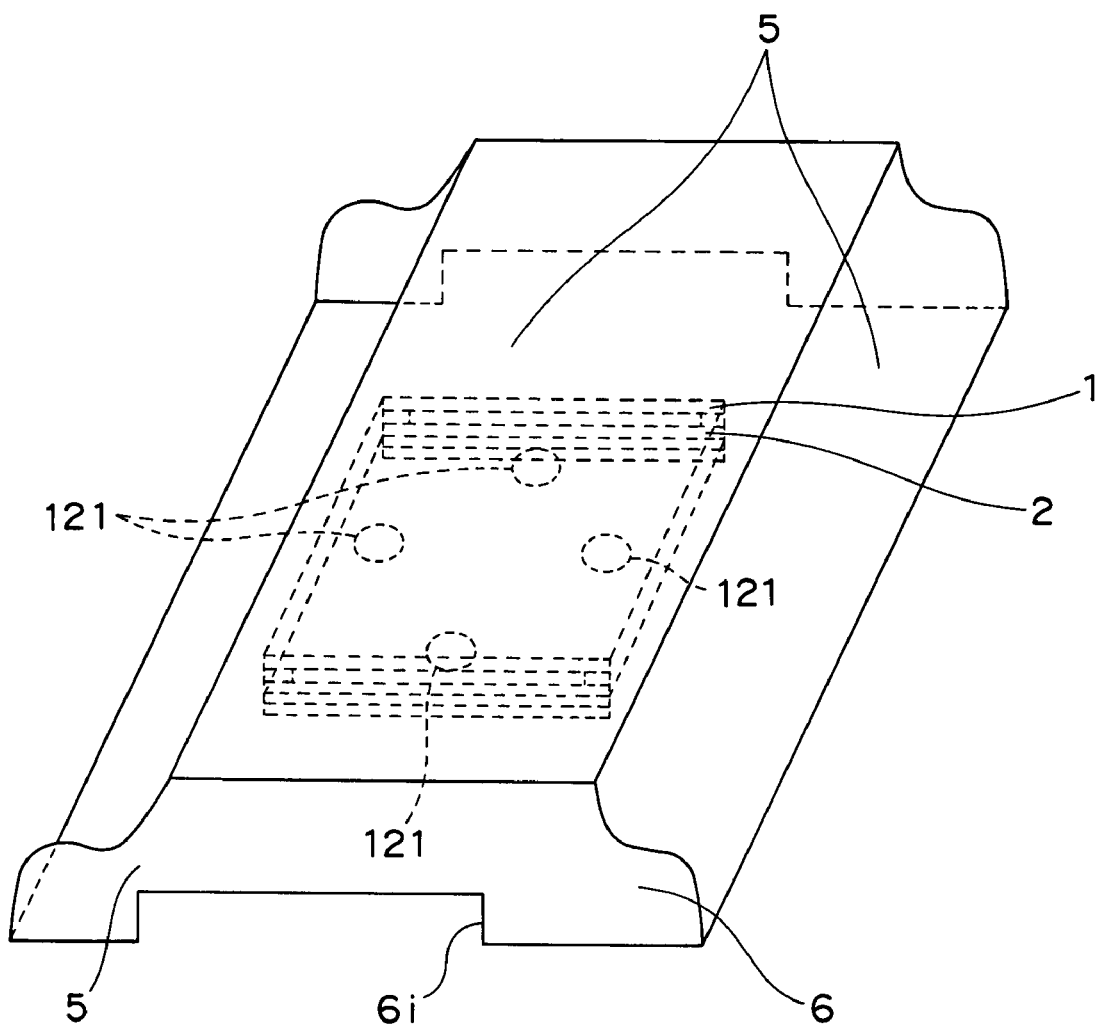
FIG. 10 is a perspective view of the touch panel unit according to the third embodiment.

It is preferable to form the air hole 121 in the touch panel periphery such that the air hole 121 penetrates through the lower electrode film 2 from the back surface of the touch panel 4, in order to prevent the functions and the external appearance of the touch panel 4 from being degraded, as illustrated in FIGS. 1A and 4. In the case where a plurality of (for example, four) air holes 121 are provided as illustrated in FIG. 10, it is preferable to place them in a well-balanced manner, in order to allow air to pass substantially uniformly between the air layer 19 and the outside. Further, in other embodiments, although not illustrated in detail, an air hole 121 having basically the same structure is provided.

Figure 5:
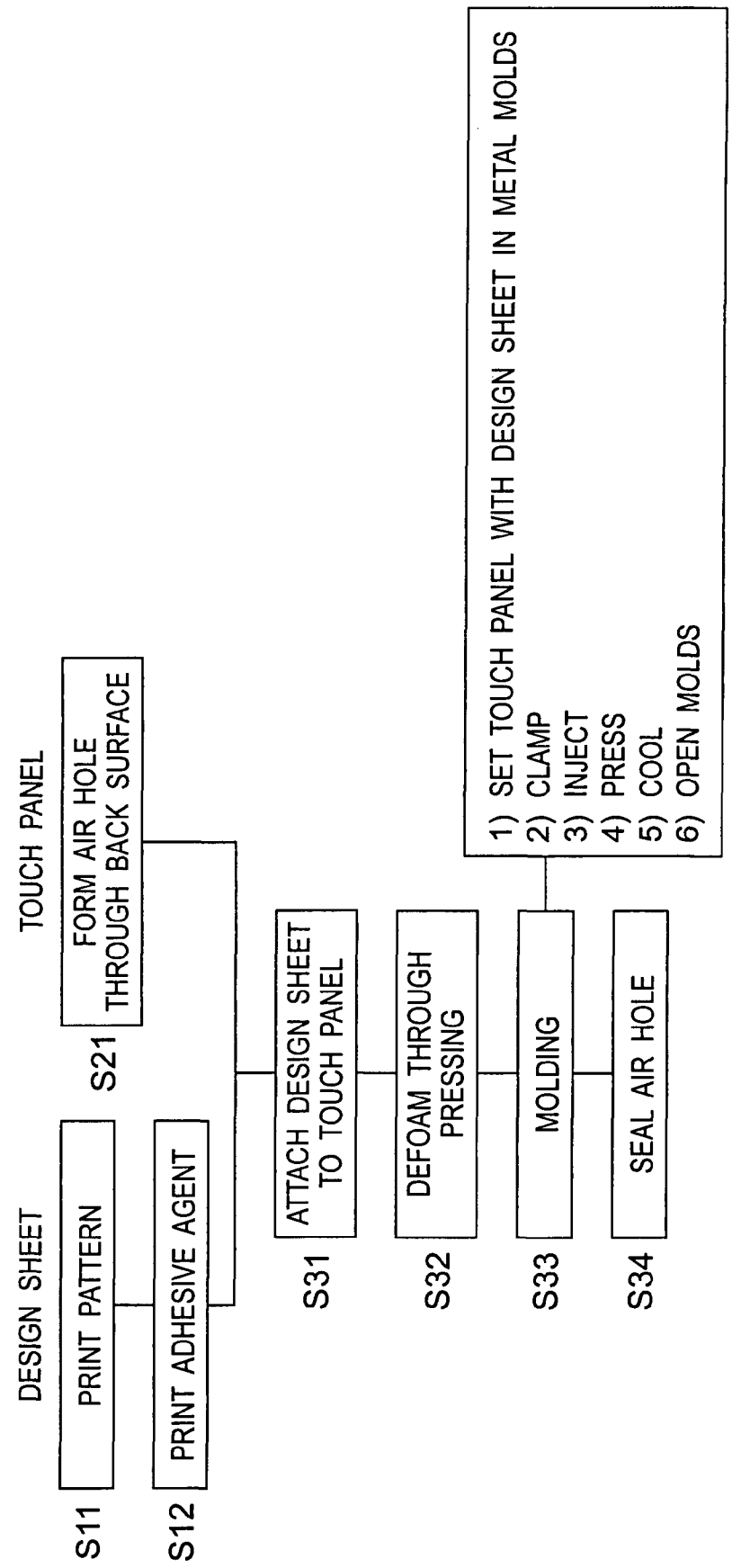
FIG. 5 is a process view of a method for manufacturing the touch panel unit according to the first embodiment.
Figure 6:
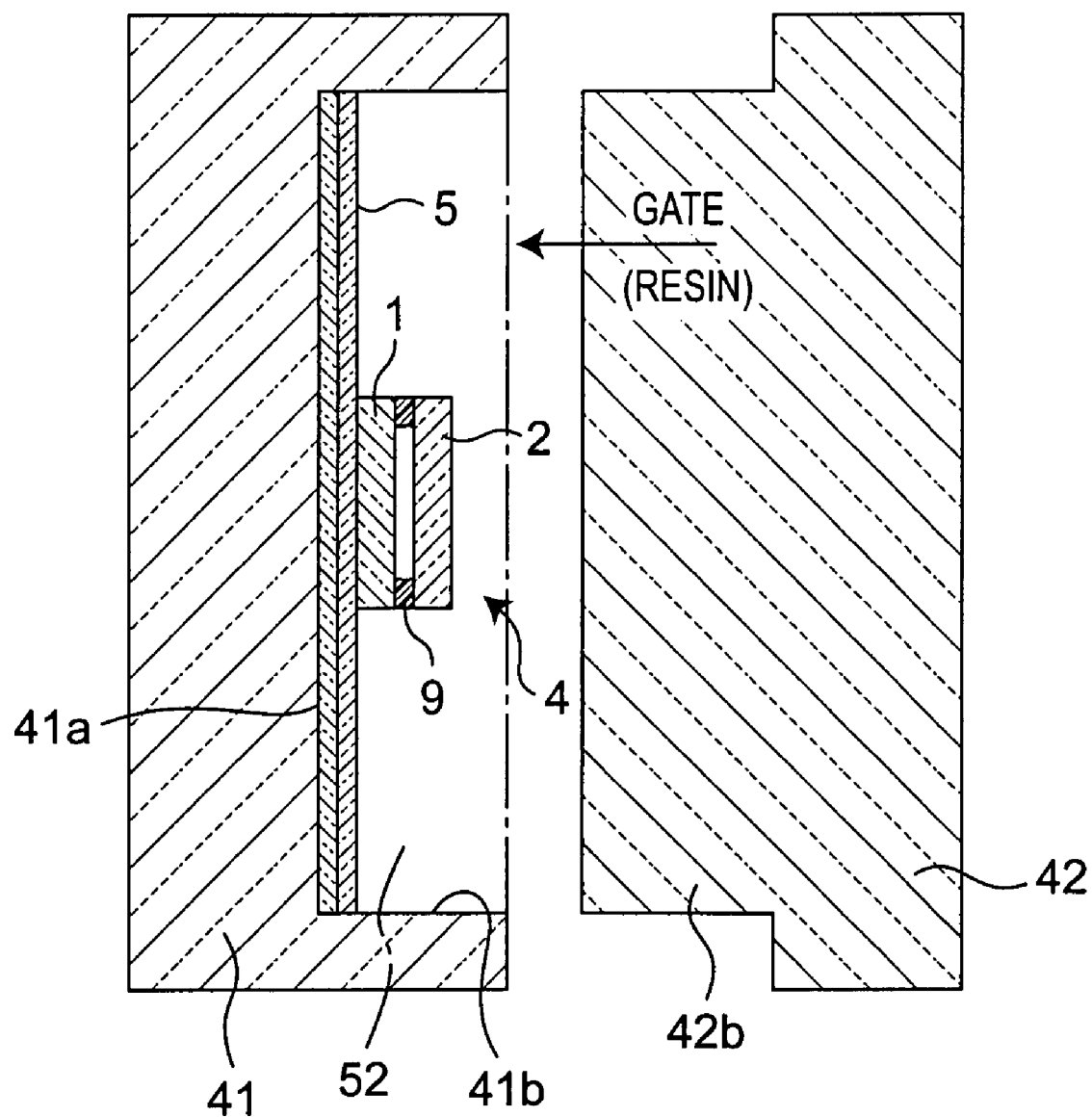
FIG. 6 is a cross-sectional view of a metal mold for use in the method for manufacturing the touch panel unit according to the first embodiment.
Figure 7:
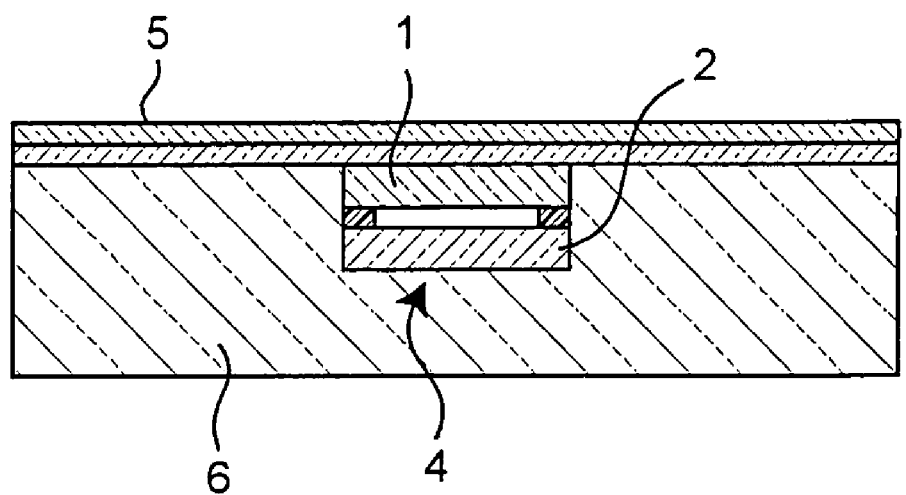
FIG. 7 is a schematic typical cross-sectional view of a touch panel unit as a molded product molded with the metal mold of FIG. 6.

Next, FIG. 5 is a process view of a method for manufacturing a touch panel unit according to the first embodiment. Further, FIG. 6 illustrates a metal mold for use in this manufacturing method and FIG. 7 illustrates the molded touch panel unit, wherein the metal mold of FIG. 6 and the molded touch panel unit of FIG. 7 are schematically and simply illustrated, for ease of description.

For the design sheet 5, a pattern printing process (step S11) of forming, through printing, the pattern layer 5c on the flexible transparent insulation substrate 5a including the hard coat layer 5b and an adhesive-agent printing process (step S12) of forming, through printing, the adhesive layer 5d on the flexible transparent insulation substrate 5a at the area opposing to the touch panel 4 are performed in this order. In parallel with these processes, for the touch panel 4, a process of forming the air hole 121 and the through holes 21 through the lower electrode film 2 on the back surface side of the touch panel 4 with a drill or a pressing machine (step S21) is performed before or after completion of the touch panel 4.

Next, a process of attaching the design sheet 5 resulted from the adhesive-agent printing process (step S12) to the touch panel 4 resulted from the through-hole forming process (step S21) by the adhesive layer 5d (step S31) is performed.

Next, a press-defoaming process (step S32) is performed for pressing the surfaces of the design sheet 5 and the touch panel 4 attached to each other through the adhesive layer 5d for removing air included between their attached surfaces (between the design sheet 5 and the adhesive layer 5d and between the upper electrode film 1 in the touch panel 4 and the adhesive layer 5d).

Next, a process for molding the supporting plate-cum-casing 6 (step S33) is performed. This molding process (step S33) includes six processes, as illustrated in FIG. 6. First, 1) in the process of setting in a female metal mold 41 the touch panel 4 with the design sheet 5, the design sheet 5 is placed on the entire bottom surface 41a of a recessed portion 41b of the female metal mold 41. A cavity for molding the supporting plate-cum-casing (see a dashed-dotted line in FIG. 6) can be formed during clamping, between the concave portion 41b of the female metal mold 41 and a convex portion 42b of a male metal mold 42 (more concretely, the male metal mold 42 has a convex portion for molding the lower recessed portion 6c, but it is not illustrated in the figure for ease of understanding). Next, 2) a process of clamping the female metal mold 41 and the male metal mold 42 to form the cavity 52 for molding the supporting plate-cum-casing is performed. Next, 3) a process of injecting a molten resin for molding the supporting plate-cum-casing into the cavity 52 is performed. Next, 4) a process of keeping the female metal mold 41 and the male metal mold 42 pressed against each other in the state where the cavity 52 is filled with the molten resin for molding the supporting plate-cum-casing is performed. Next, 5) a process of cooling the female metal mold 41 and the male metal mold 42 for cooling and solidifying the molten resin for molding the supporting plate-cum-casing within the cavity 52 is performed. Next, 6) a process of opening the female metal mold 41 and the male metal mold 42 for taking the molded product, namely the touch panel unit, out of the cavity 52 is performed. Further, since through holes 6p and 6q are formed through the supporting plate-cum-casing 6 corresponding to the air hole 121 and the four external-substrate connection through holes 21, during the process for molding the supporting plate-cum-casing 6, the air hole 121 and the four external-substrate connection through holes 21 are communicated to the outside of the supporting plate-cum-casing 6, namely the outside of the touch panel unit at the back surface thereof.

Then, a process of sealing the air hole 121 in the taken-out touch panel unit with the UV-curable resin 122 (step S34) is performed. Further, the conductive adhesive agent 22 is filled in the four external-substrate connection through holes 21 and, further, the four metal pins 23 as exemplary conductors are inserted or press-fitted into the conductive adhesive agent 22 in the four external-substrate connection through holes 21 to be secured thereto.

Consequently, the touch panel unit of FIG. 7 is completed. Further, FIG. 7 corresponds to the touch panel unit of FIG. 1A and is a schematic typical cross-sectional view of the touch panel unit as a molded product molded with the metal mold of FIG. 6.

According to the first embodiment, the design sheet 5 is attached to the surface of the upper electrode film 1 in the touch panel 4 such that the design sheet 5 is protruded at its periphery from the touch panel 4, and the touch-panel-unit casing 6 is molded integrally with the design sheet 5, so that the design sheet 5 covers the surface of the touch-panel-unit casing 6 and the touch-panel-unit casing 6 surrounds the side surfaces of the touch panel 4, which completely eliminates the level difference between the portion at which the touch panel 4 is placed and the touch-panel-unit casing 6 when the touch panel unit is viewed from the outside thereof, thereby offering a structure of good design having a flat surface. Further, since there is no level difference between the upper casing 6 and the portion at which the touch panel 4 is placed, and thus no gap therebetween, it is possible to prevent malfunction caused by the clogging due to foreign substances such as dusts.

Further, the casing 6 and the touch panel 4 are not overlapped with each other, which can prevent the occurrence of false input to the touch panel 4, even if the casing 6 is pushed during input operations. Further, since there is no level difference between the casing 6 and the portion at which the touch panel 4 is placed when the touch panel unit is viewed from the outside thereof, it is possible to prevent the touch panel 4 from repeatedly sliding at the same position along the edge of the opening portion by being guided by the level difference, thereby preventing the occurrence of degradation of the touch-inputting function. Further, when dirt such as oils adhering to the touch operation surface (the operation area 4v of the touch panel 4) through inputting or the like is wiped away, it is possible to wipe away the dirt on the operation area 4v of the touch panel 4 completely, since there is no level difference between the casing 6 and the portion at which the touch panel 4 is placed when the touch panel unit is viewed from the outside thereof.

Further, it is possible to easily form the design sheet 5 having a peripheral frame pattern or having characters describing a brand name or a model name printed thereon integrally with the casing 6 to attach the design sheet 5 to the casing 6 in order to improve the design of the electronic apparatus without reducing the sizes of the effective display area of the display and the effective input area of the touch panel 4.

Further, the design sheet 5 covers the portion at which the casing 6 and the touch panel 4 are coupled to each other such that they are sealed from the outside, which can improve the humidity resistance, also can prevent the intrusion of gas thereby preventing corrosion, can prevent the intrusion of water even when the electronic apparatus incorporating the touch panel unit is accidentally submerged, and also can prevent the exfoliation of the design sheet 5.

Further, the present invention is not limited to the aforementioned embodiment and can be implemented in other various modes.

Figure 8A:
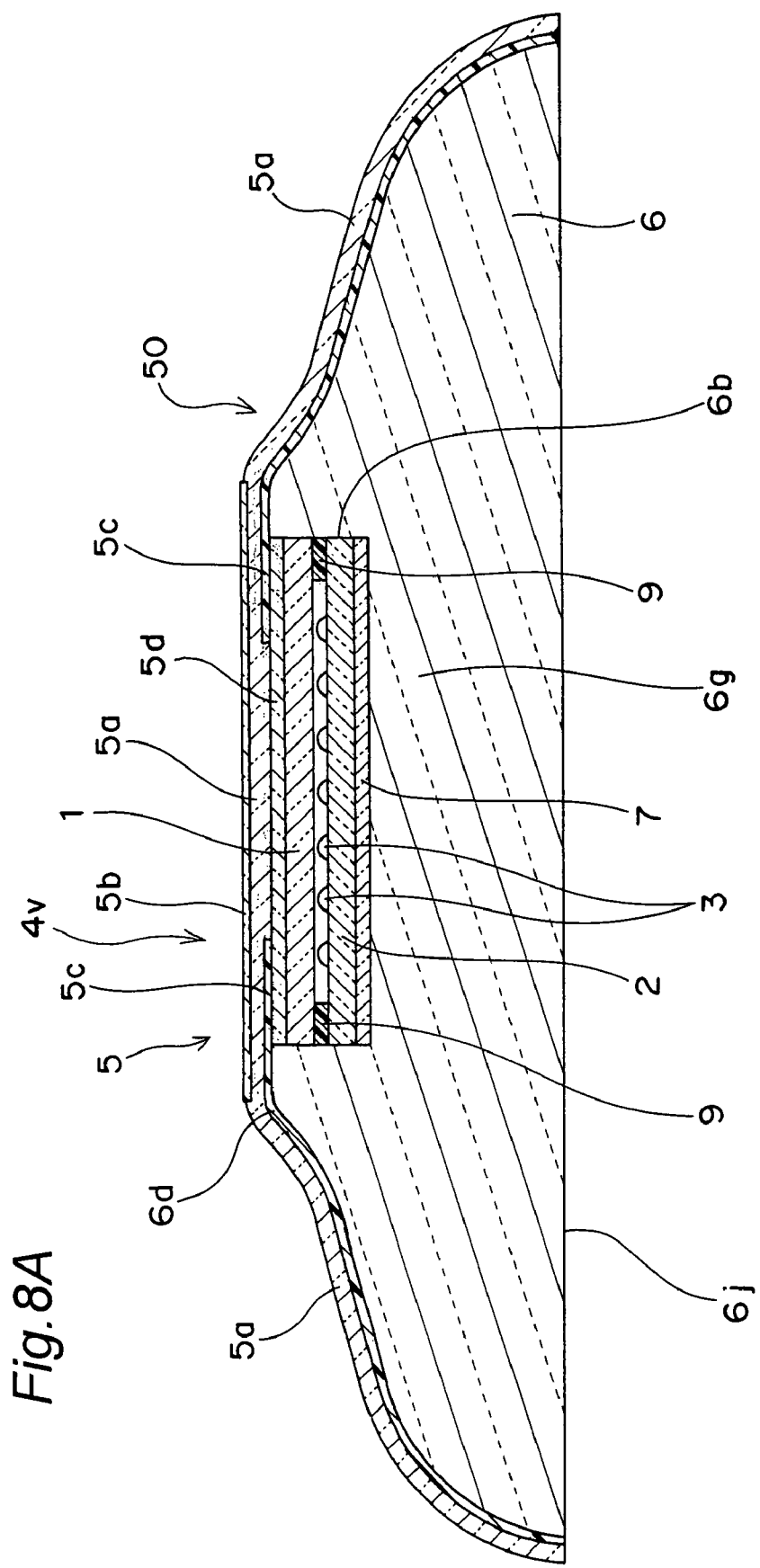
FIG. 8A is a cross-sectional view of a touch panel unit according to a second embodiment of the present invention.

For example, according to a second embodiment of the present invention, there can be provided an integrally-molded touch panel unit having a flat lower surface 6j instead of the lower recessed portion 6c formed in the lower portion of the supporting plate-cum-casing 6, as illustrated in FIGS. 8A and 8B.

Figure 9B:
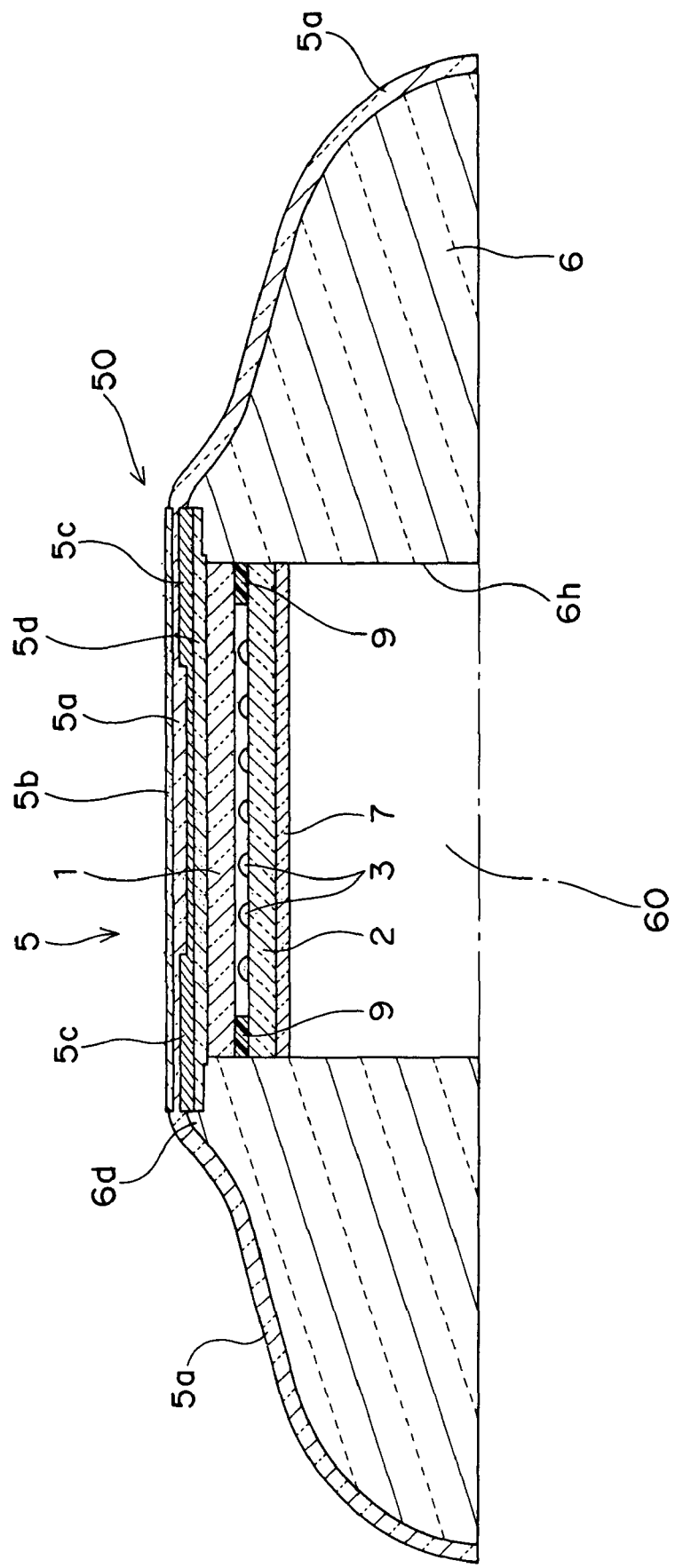
FIG. 9B is a cross-sectional view of a touch panel unit according to a modification of the third embodiment of the present invention.

Also, according to a third embodiment of the present invention, there can be provided an integrally-molded touch panel unit having a T-shaped through hole 6h formed by coupling the lower recessed portion 6c formed in the lower portion of the supporting plate-cum-casing 6 to the recessed portion 6b, as illustrated in FIGS. 9A and 9B. By fitting the display unit 60 in the T-shaped through hole 6h, it is possible to position, easily, the display unit 60 and the touch panel 4.

Further, the T-shaped through hole 6h is adapted to be communicated with a slot portion 6i formed in the lower surface of the touch panel unit along the longitudinal direction. Also, the T-shaped through hole 6h can be formed by hollowing out the supporting plate-cum-casing 6 only at the portion into which the display unit 60 is to be fitted.

In the integrally-molded touch panel unit according to the third embodiment, as illustrated in FIG. 10, four air holes 121 are preliminarily formed using a drill or a pressing machine through the lower electrode film 2 and the supporting plate-cum-casing 6, in the touch panel 4, at the periphery of the touch panel and near the center portions of the respective sides of the rectangular-shaped touch panel 4, which allows air to pass substantially uniformly between the air layer 19 and the outside.

Figure 11:
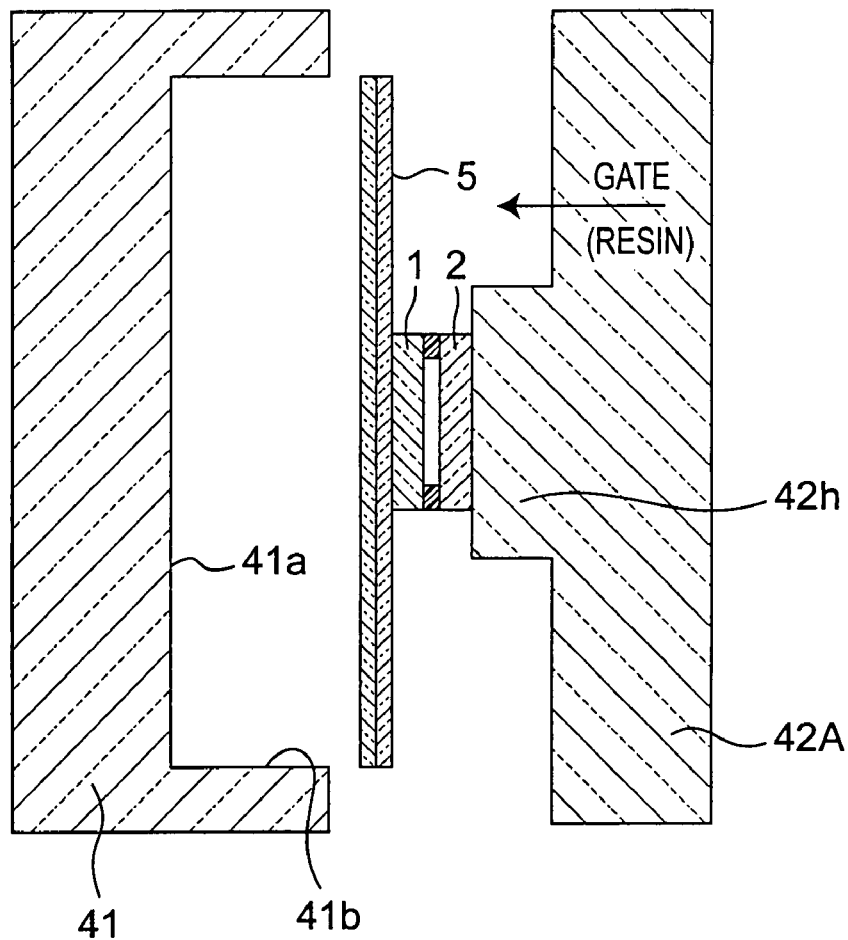
FIG. 11 is a cross-sectional view of a metal mold for use in a method for manufacturing the touch panel unit according to the third embodiment.
Figure 12:
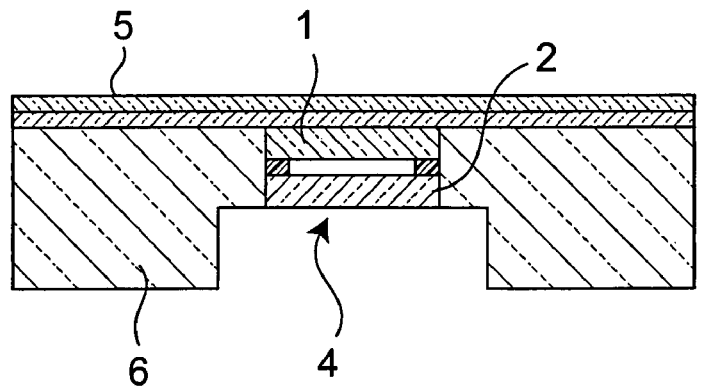
FIG. 12 is a cross-sectional view of a touch panel unit as a molded product molded with the metal mold of FIG. 11.

Next, a method for manufacturing the touch panel unit according to the third embodiment is similar to that in the first embodiment, but is slightly different therefrom in the metal mold to be used. FIG. 11 illustrates the metal mold to be used in the method for manufacturing the touch panel unit according to the third embodiment and FIG. 12 illustrates the molded touch panel unit, wherein the metal mold of FIG. 11 and the touch panel unit of FIG. 12 are simply and schematically illustrated for ease of description.

The metal mold of FIG. 11 consists of a female metal mold 41 which is the same as that of FIG. 6 and a male metal mold 42A which is different from that of FIG. 6. Namely, the male metal mold 42A has a convex portion 42h smaller than the convex portion 42b of the male metal mold of FIG. 6 and forms a cavity forming surface having a size equal to or slightly greater than that of the touch panel 4. This enables molding of a touch panel unit which exposes the lower surface of the touch panel 4 or the periphery of the lower surface of the touch panel 4, as illustrated in FIG. 12.

Figure 13:
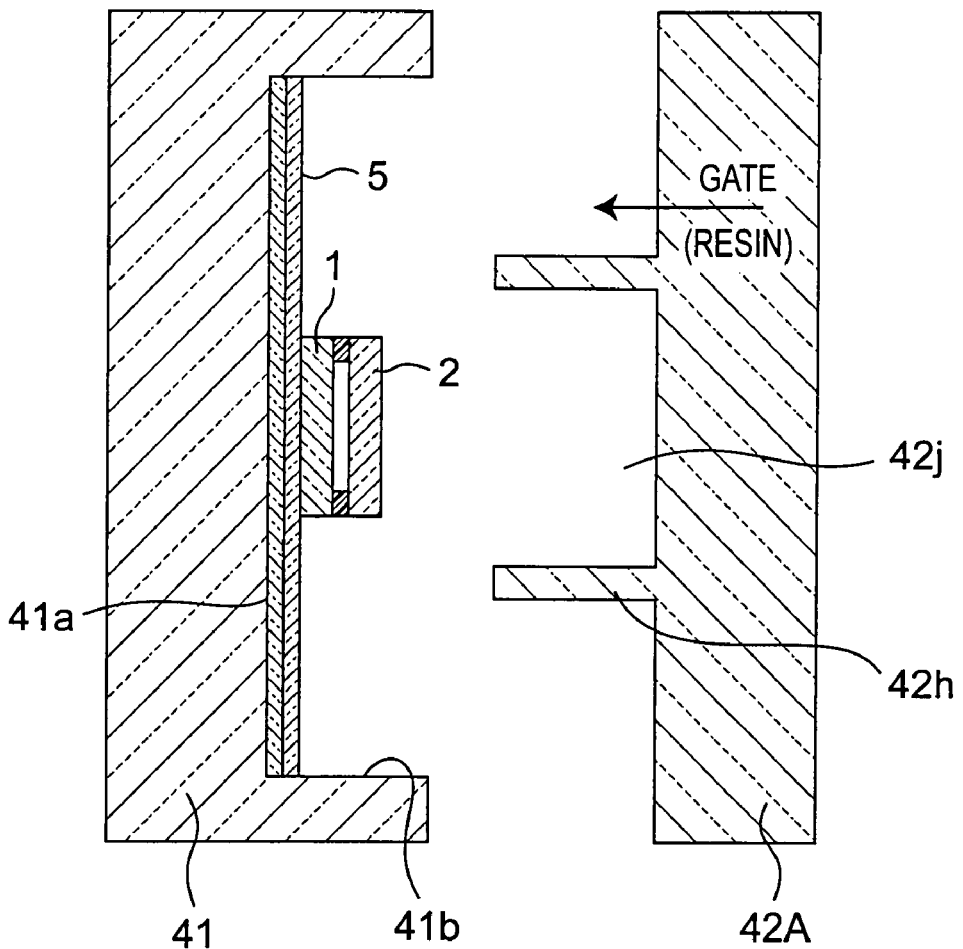
FIG. 13 is a cross-sectional view of a metal mold according to a modification of the metal mold of FIG. 11.
Figure 14:
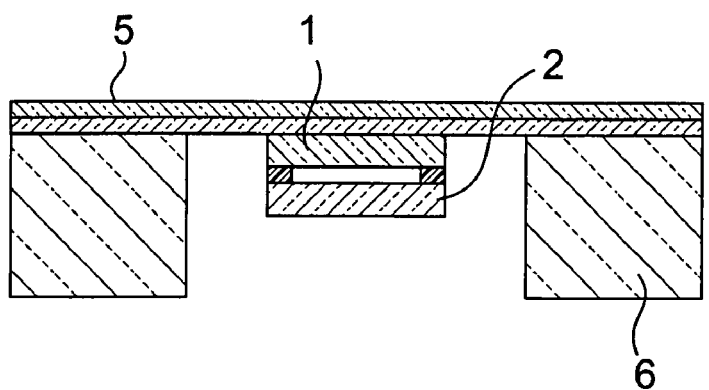
FIG. 14 is a cross-sectional view of a touch panel unit as a molded product molded with the metal mold of FIG. 13.

Also, as illustrated as a modification in FIGS. 13 and 14, a recessed portion 42j can be further formed in the convex portion 42h of the female metal mold 42A in order to form a space around the touch panel 4. By forming the space around the touch panel 4 as described above, it is possible to prevent the resin from coming into contact with the touch panel during the molding, thereby preventing the touch panel from being subjected to unnecessary stress. This can prevent the waviness and wave undulation of the touch panel surface.

Figure 15A:
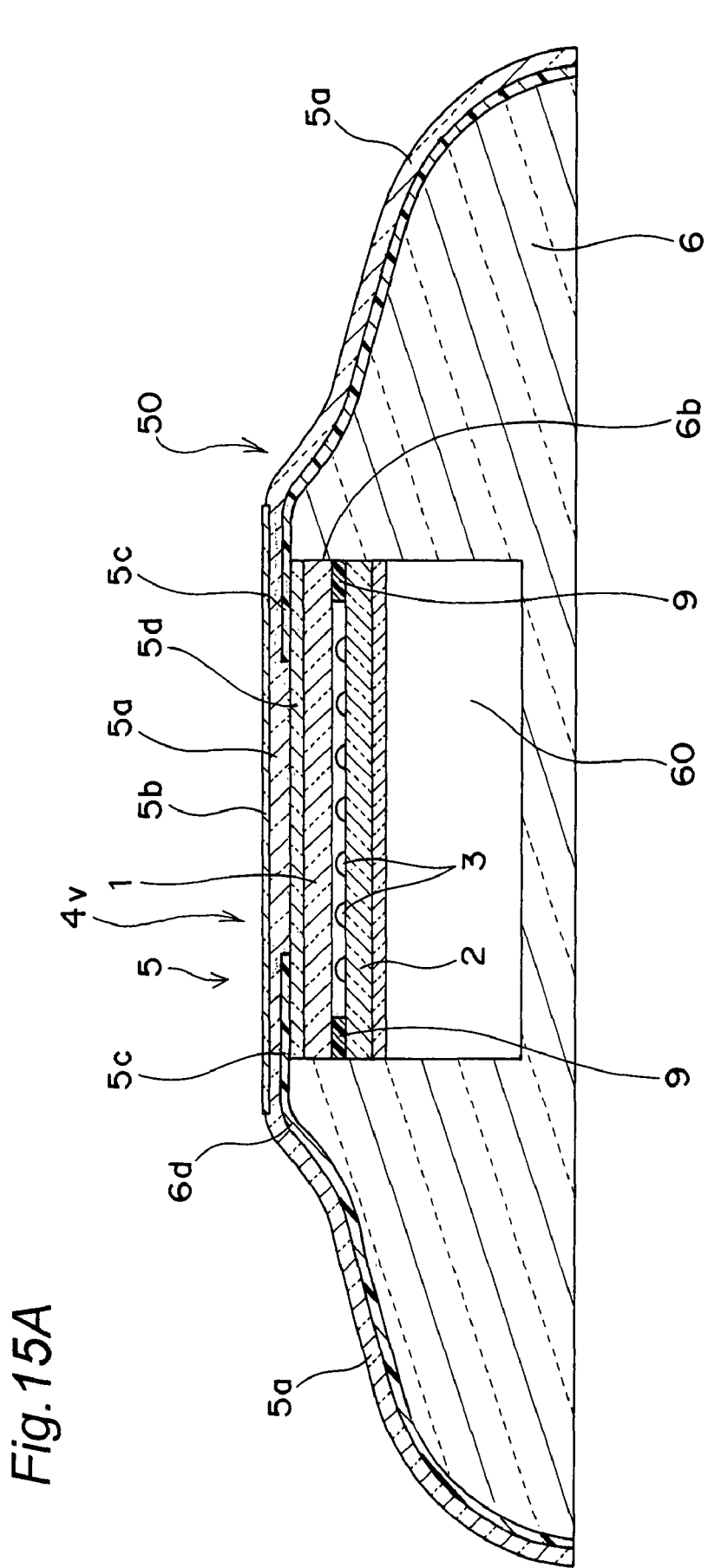
FIG. 15A is a cross-sectional view of a touch panel unit according to a fourth embodiment of the present invention.
Figure 15B:
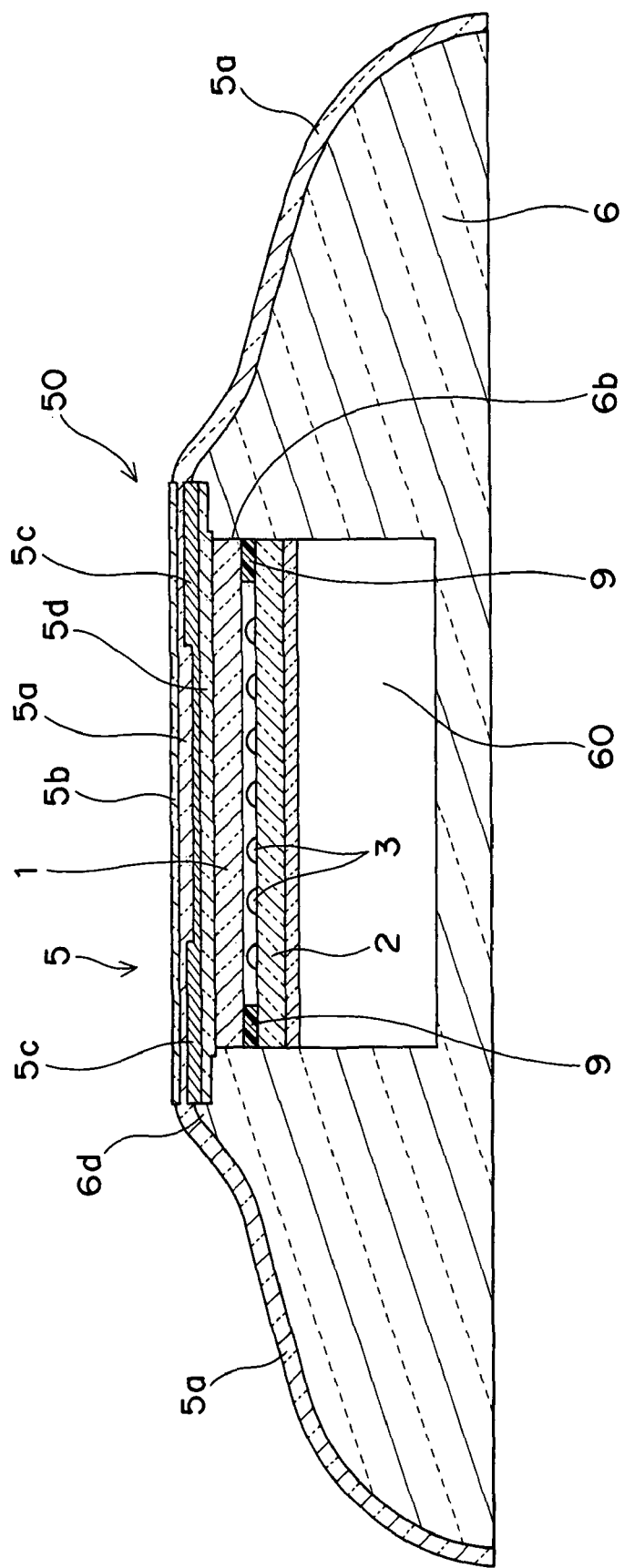
FIG. 15B is a cross-sectional view of a touch panel unit according to a modification of the fourth embodiment of the present invention.
Figure 16:
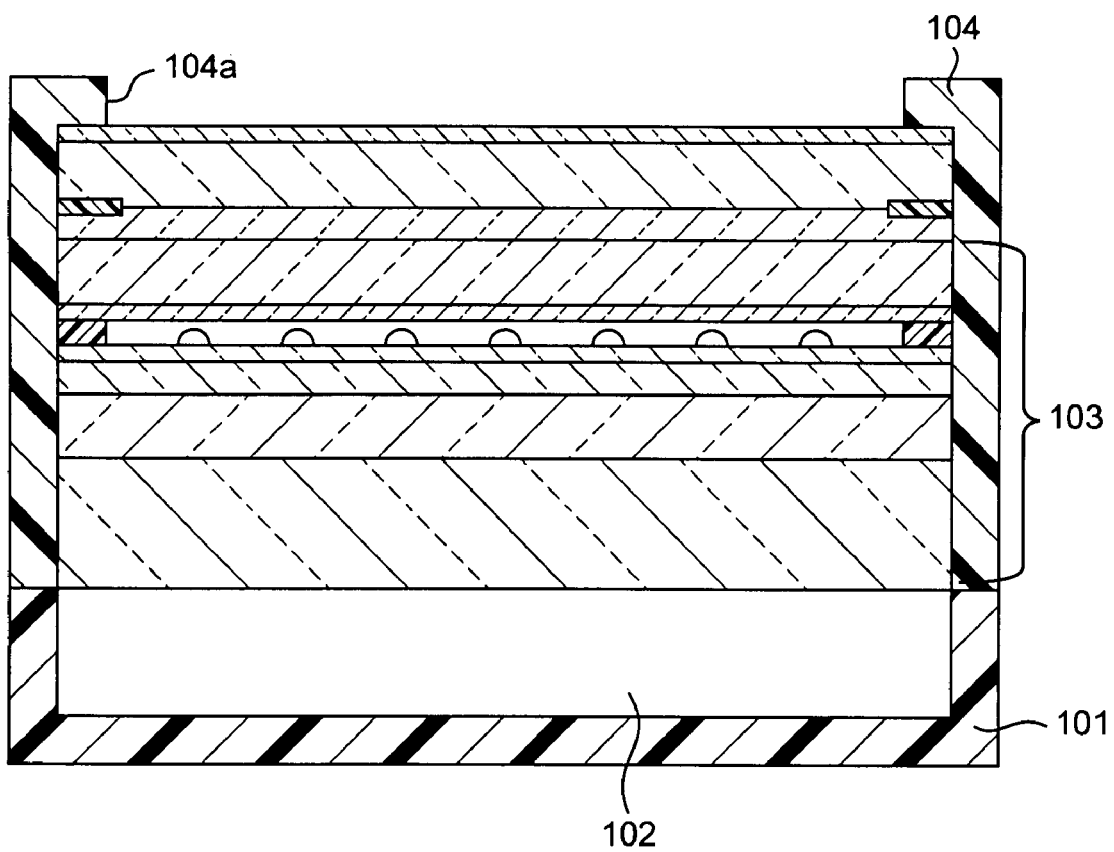
FIG. 16 is a cross-sectional view of a structure for mounting a conventional touch panel.

Also, as an integrally-molded touch panel unit according to a fourth embodiment of the present invention, as illustrated in FIGS. 15A and 15B, a supporting plate-cum-casing 6 can be molded integrally in a state where the display unit 60 is secured to the lower surface of the touch panel 4.

Figure 20:
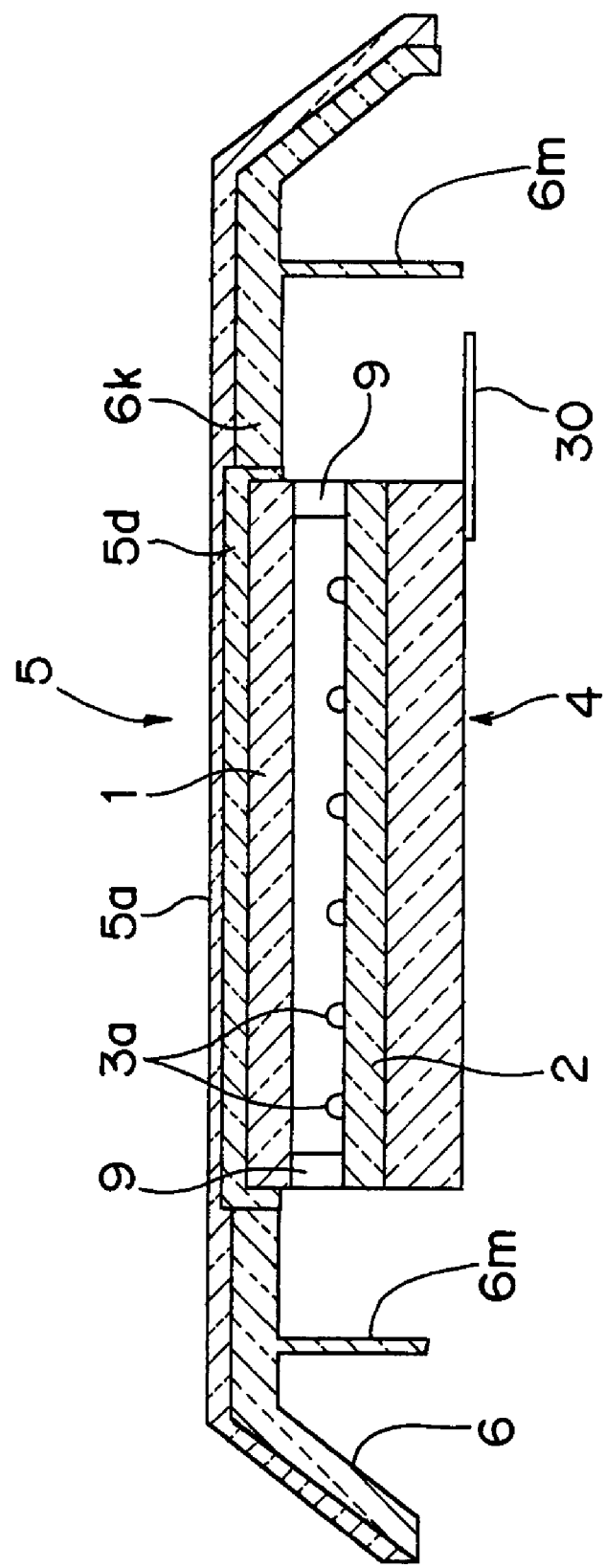
FIG. 20 is a schematic cross-sectional view of a touch panel unit according to a modification of the present invention.

Further, FIG. 20 is a schematic cross-sectional view of a touch panel unit according to a modification of the present invention (the positions of the transparent insulation substrate 5a and the adhesive layer 5d are schematically illustrated, while the hard coat layer 5b and the pattern layer 5c are not illustrated), wherein ribs 6m are preferably formed on the back surface of a quadrilateral-plate-shaped plane portion 6k of the supporting plate-cum-casing 6 along the four sides at the periphery thereof. This is because (1) these ribs can prevent the occurrence of warpage during the molding and during environment tests (high-temperature tests) and (2) these ribs can prevent the deformation and the warpage due to stress during inputting. The thickness of the ribs 6m can be changed according to the shape of the molded product, and the rigidity can be increased with the increase in thickness thereof.

Accordingly, for example, when the molded product has a rectangular shape, it is preferable to form the ribs 6m near the longer sides and the ribs 6m near the shorter sides such that the thickness of the ribs 6m near the longer sides is greater than that of the ribs 6m near the shorter sides. The rigidity can be increased with the increase in height of the ribs 6m. However, if the height of the ribs 6m is excessively increased, this will make it difficult to pull out the molded touch panel unit from the metal mold during the molding. Accordingly, it is preferable that the height of the ribs 6m falls in the range of about 1.5 mm to 2.5 mm.

By properly combining the arbitrary embodiments of the aforementioned various embodiments, the effects possessed by the embodiments can be produced.

INDUSTRIAL APPLICABILITY

The integrally-molded touch panel unit according to the present invention enables touch-inputting through a display window in an electronic apparatus, preventing the touch-inputting operation surface from being slid at the same portion due to a level difference in the casing, easily wiping away dirt such as oils, and has a structure of good design having a flat surface, the structure allowing placement of a design sheet without reducing the sizes of the effective display area of the display and the effective input area of the touch panel.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An integrally-molded touch panel unit comprising:
a touch panel comprising an upper electrode film and a lower electrode film which are placed oppositely with dot spacers interposed therebetween such that electrode surfaces of the upper and lower electrode films are faced inwardly;
a design sheet attached to an entire surface of the upper electrode film such that the design sheet protrudes at its periphery from the touch panel; and
a one-piece molded touch-panel-unit casing surrounding all side surfaces of the touch panel and covering a back surface of the lower electrode film, and being integrally molded with the design sheet such that the casing is covered at a surface thereof with the design sheet.

2. The integrally-molded touch panel unit according to claim 1, wherein the one-piece molded touch-panel-unit casing has a touch panel supporting portion contacting the back surface of the lower electrode film so as to support the touch panel.

3. The integrally-molded touch panel unit according to claim 1, wherein an air hole is provided through the lower electrode film.

4. The integrally-molded touch panel unit according to claim 2, wherein an air hole is provided through the lower electrode film.

5. The integrally-molded touch panel unit according to claim 2, wherein the lower electrode film and the touch panel supporting portion of the one-piece molded touch-panel-unit casing are attached to each other by an adhesive agent.

6. The integrally-molded touch panel unit according to claim 1, wherein a through hole is provided through the lower electrode film and the touch-panel-unit casing, and a conductor for connecting an external substrate to a connection terminal in the touch panel is provided within the through hole.

7. The integrally-molded touch panel unit according to claim 2, wherein a through hole is provided through the lower electrode film and the touch-panel-unit casing, and a conductor for connecting an external substrate to a connection terminal in the touch panel is provided within the through hole.

\* \* \* \* \*